(12) United States Patent
Wada et al.

(10) Patent No.: US 8,369,020 B2
(45) Date of Patent: Feb. 5, 2013

(54) ZOOM LENS AND IMAGE PICKUP APPARATUS INCLUDING THE SAME

(75) Inventors: Ken Wada, Sakura (JP); Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/109,779

(22) Filed: May 17, 2011

(65) Prior Publication Data

US 2011/0292520 A1 Dec. 1, 2011

(30) Foreign Application Priority Data

May 28, 2010 (JP) .................... PCT/JP2010/059095

(51) Int. Cl.
*G02B 3/14* (2006.01)
*G02B 15/14* (2006.01)
(52) U.S. Cl. .................... 359/666; 359/665; 359/676
(58) Field of Classification Search .................... 359/665, 359/666, 676
See application file for complete search history.

(56) References Cited

U.S. PATENT DOCUMENTS

2011/0002043 A1* 1/2011 Seo et al. ................... 359/666

FOREIGN PATENT DOCUMENTS

| JP | 62-024210 A | 2/1987 |
|----|-------------|--------|
| JP | 62-078521 A | 4/1987 |
| JP | 2001-033699 A | 2/2001 |
| JP | 2006-098972 A | 4/2006 |
| JP | 2007-094172 A | 4/2007 |
| JP | 2007-128085 A | 5/2007 |
| JP | 2008-203650 A | 9/2008 |
| JP | 2008-541184 A | 11/2008 |

* cited by examiner

*Primary Examiner* — William Choi
(74) *Attorney, Agent, or Firm* — Canon U.S.A., Inc. IP Division

(57) ABSTRACT

A zoom lens includes a first variable refractive power element that changes a refractive power thereof in a positive direction by changing a shape of an interface between different media during zooming from a wide angle end to a telephoto end; and a second variable refractive power element that changes a refractive power thereof in a negative direction by changing a shape of an interface between different media during zooming from a wide angle end to a telephoto end. An imaging magnification of at least one of the variable refractive power elements increases during zooming from the wide angle end to the telephoto end. Variations in chromatic aberration and other distortions are controlled when predetermined conditional expressions are satisfied.

8 Claims, 12 Drawing Sheets

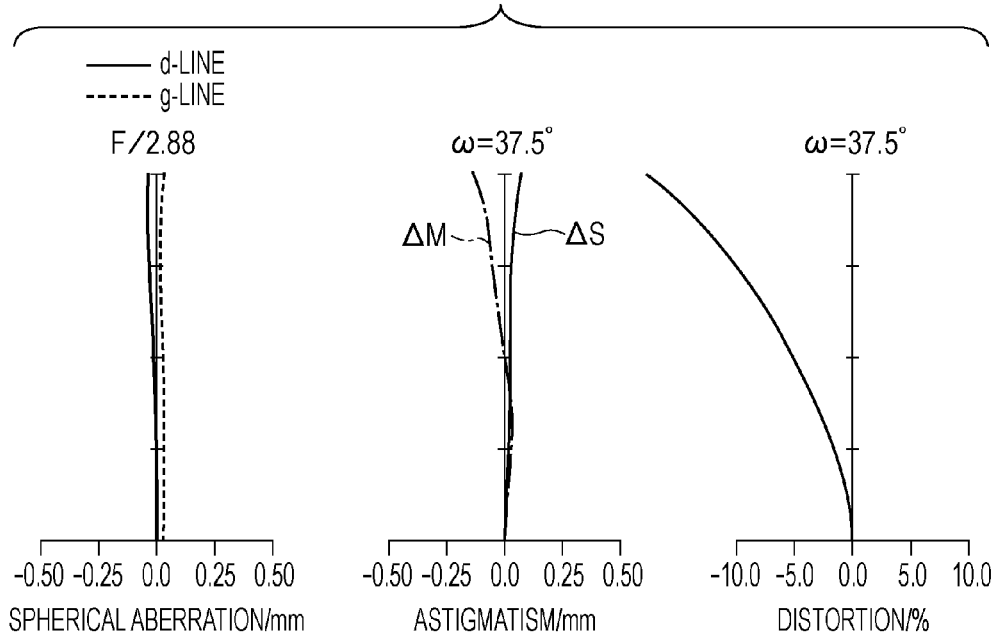
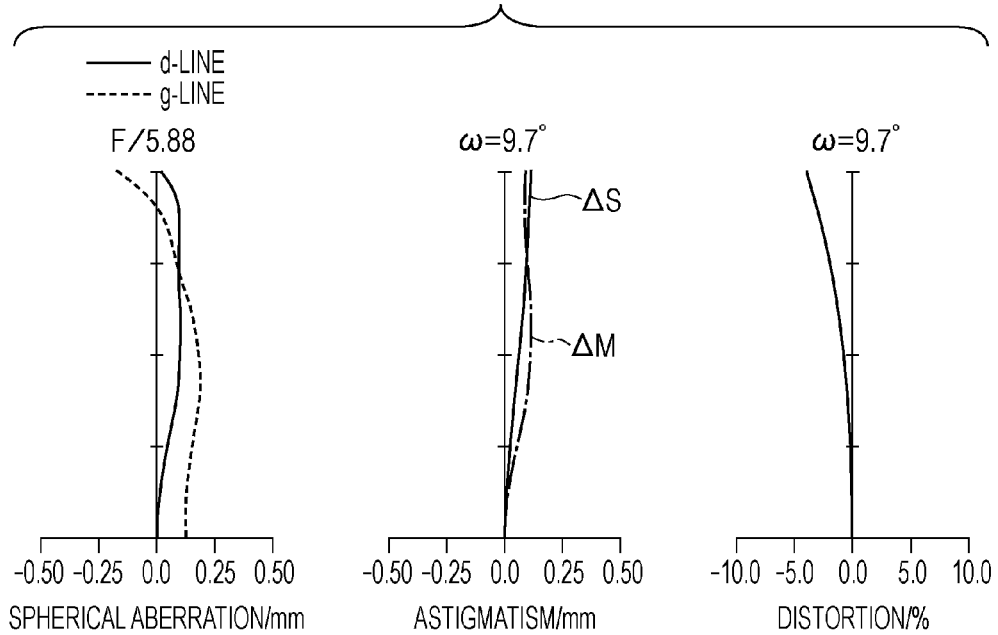

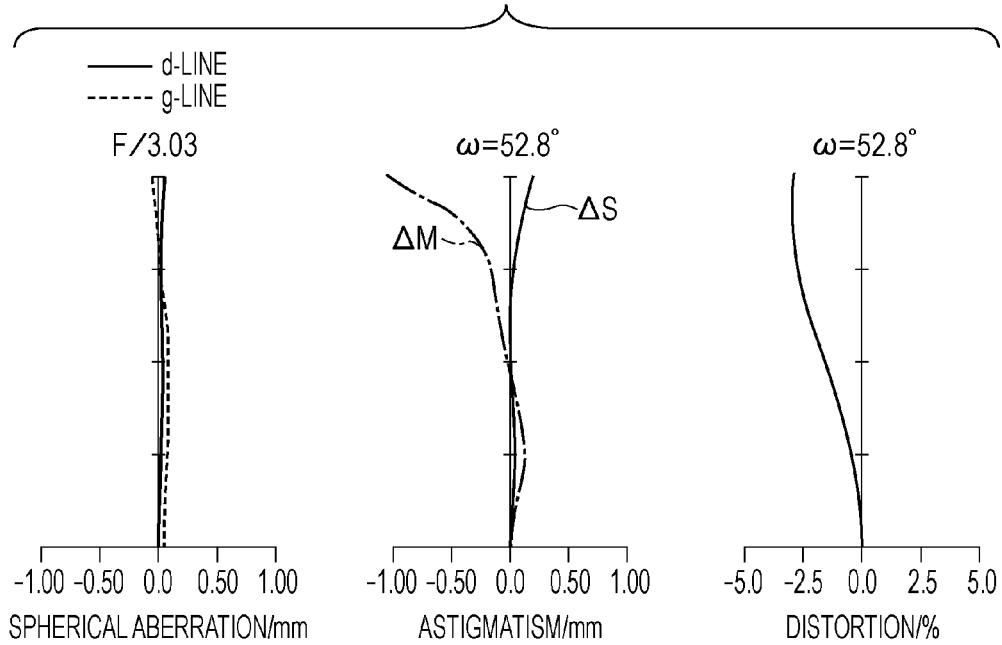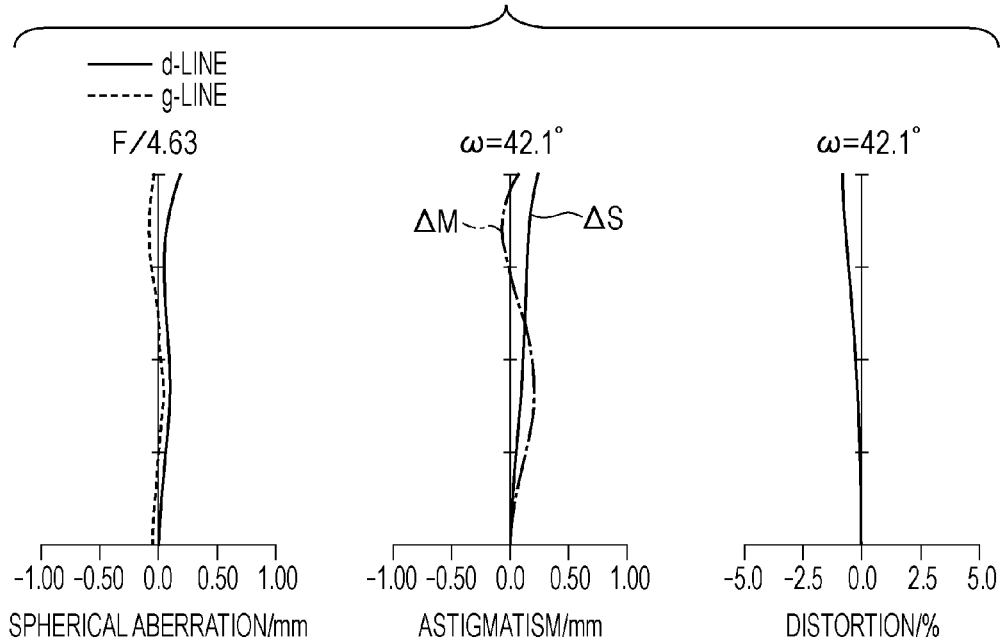

ZOOM LENS AND IMAGE PICKUP APPARATUS INCLUDING THE SAME

TECHNICAL FIELD

The present invention relates to a zoom lens including a variable refractive power element. The zoom lens according to the present invention is suitable for, for example, an image-taking lens of a digital still camera or the like.

BACKGROUND ART

There are existing optical elements that are capable of changing the refractive power thereof by changing the curvature of the interface between two optically transmissive materials (e.g., liquids).

FIG. 11A illustrates a variable refractive power element 100 including two liquids that do not mix with each other. Electrodes 101, which are covered with insulators, are disposed so as to be in contact with liquid 103 and liquid 104. In addition, electrodes 102 are disposed so as to be in contact with the liquid 103. When a voltage is applied between the electrodes 101 and the electrodes 102, electric charges are generated on the surfaces of the electrodes 101, so that the balance of the tension generated between the electrodes 101 and the liquid 103, and the tension generated between the electrodes 101 and the liquid 104 is changed. Thus, the curvature of the interface between the two liquids 103 and 104 can be changed.

FIG. 11B illustrates a variable refractive power element 200 including an elastic film 203 between two liquids 201 and 202. The elastic film 203 is deformed by moving the two liquids 201 and 202 by using a driving unit 204, whereby the refractive power of the element 200 can be changed. For the variable refractive power element 200, liquids that mix with each other may be used as the two liquids 201 and 202.

Zoom lenses including the above-described variable refractive power element are known. Patent Literature (PTL) documents 1 and 2 each describe a zoom lens in which the movement amounts of lens units during zooming are reduced or eliminated by using a plurality of variable refractive power elements and thereby the total length of the zoom lens is reduced.

Patent Literature 3 describes a zoom lens that reduces variation in chromatic aberration due to zooming by changing the shape of the interface between different media having about the same refractive index and different Abbe numbers.

Citation List

Patent Literature

PTL 1 Japanese Patent Laid-Open No. 2006-98972
PTL 2 Japanese Patent Laid-Open No. 62-24210
PTL 3 Japanese Patent Laid-Open No. 62-78521

In an optical system including a variable refractive power element, the larger the magnification during zooming, the larger the change in refractive power during zooming, and larger the variation in chromatic aberration generated in the variable refractive power element.

The zoom lenses described in Patent Literatures 1 and 2 do not have measures against the variation of chromatic aberration due to zooming. Therefore, if the refractive power of the variable refractive power element does not change appropriately, the variation in chromatic aberration due to zooming becomes large.

The zoom lens described in Patent Literature 3 is capable of reducing the variation in chromatic aberration due to zooming. However, the refractive power does not change during zooming because the two media that form a deformable interface therebetween have the same refractive index. Accordingly, a high zoom ratio cannot be realized by using a change in the refractive power at the deformable interface.

In light of the foregoing state of the art, a zoom lens of the type described above is desired to offer a high zoom ratio and small variation in chromatic aberration due to zooming.

SUMMARY OF INVENTION

A zoom lens according to an aspect of the present invention includes a first variable refractive power element formed of different media and configured to change a refractive power thereof in a positive direction by changing a shape of an interface between the different media during zooming from a wide angle end to a telephoto end; and a second variable refractive power element formed of different media and configured to change a refractive power thereof in a negative direction by changing a shape of an interface between the different media during zooming from a wide angle end to a telephoto end, wherein an imaging magnification of at least one of the first and second variable refractive power elements increases during zooming from the wide angle end to the telephoto end, and wherein the following conditional expression is satisfied $$-0.0150 < \{\Sigma(\Delta\phi 1j/v1j) + \Sigma(\Delta\phi 2j/v2j)\} \cdot ft < 0.0075,$$

where j is an integer equal to or greater than 1 indicative of the order of the medium of the variable refractive power element counted from the side of the variable refractive power element on which light is incident, and where $\Delta\phi 1j$ is the amount of change in the refractive power of each of the media of the first variable refractive power element during zooming from the wide angle end to the telephoto end, $v1j$ is the Abbe number of each of the media of the first variable refractive power element, $\Delta\phi 2j$ is the amount of change in the refractive power of each of the media of the second variable refractive power element during zooming from the wide angle end to the telephoto end, $v2j$ is the Abbe number of each of the media of the second variable refractive power element, and ft is the focal length of the zoom lens at the telephoto end.

The present invention provides a zoom lens having a high zoom ratio and for which variation in chromatic aberration due to zooming is small.

Further features of the present invention will become apparent from the following description of exemplary embodiments with reference to the attached drawings.

BRIEF DESCRIPTION OF DRAWINGS

FIGS. 4A and 4B are aberration charts of the zoom lens according to the second embodiment of the present invention.

FIGS. 8A and 8B are aberration charts of the zoom lens according to the fourth embodiment of the present invention.

DESCRIPTION OF EMBODIMENTS

Hereinafter, embodiments of the present invention will be described with reference to the drawings.

First, features that are common to the embodiments of the present invention will be described.

A zoom lens according to each of the embodiments of the present invention includes a plurality of lens units that move from a wide angle end to a telephoto end during zooming. The lens units at least include a first variable refractive power element AO1, whose refractive power (the reciprocal of the focal length) changes in a positive direction during zooming from the wide angle end to the telephoto end, and a second variable refractive power element AO2, whose refractive power changes in a negative direction during the zooming.

A change in the refractive power in the positive direction corresponds to one of the following changes in the refractive power of the variable refractive power element: a decrease in a negative refractive power; a change from a negative refractive power to a positive refractive power; and an increase in a positive refractive power. A change in the refractive power in the negative direction corresponds to one of the following changes in the refractive power of the variable refractive power element: an increase in a negative refractive power; a change from a positive refractive power to a negative refractive power; and a decrease in a positive refractive power.

Figure 11A:
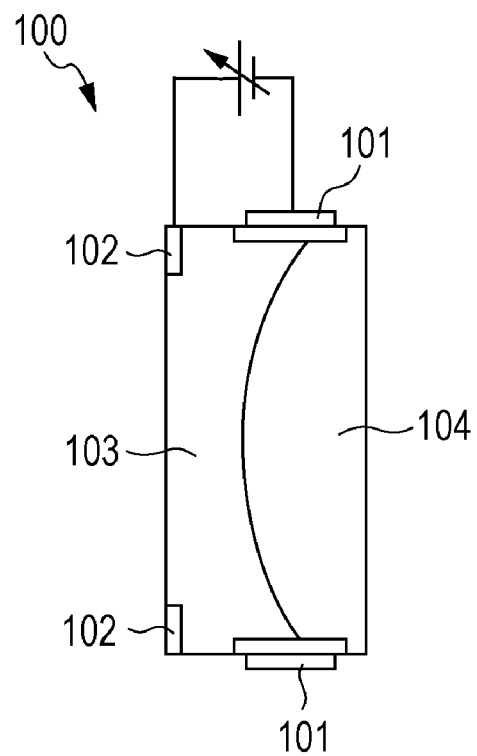
FIGS. 11A and 11B illustrate variable refractive power elements.
Figure 11B:
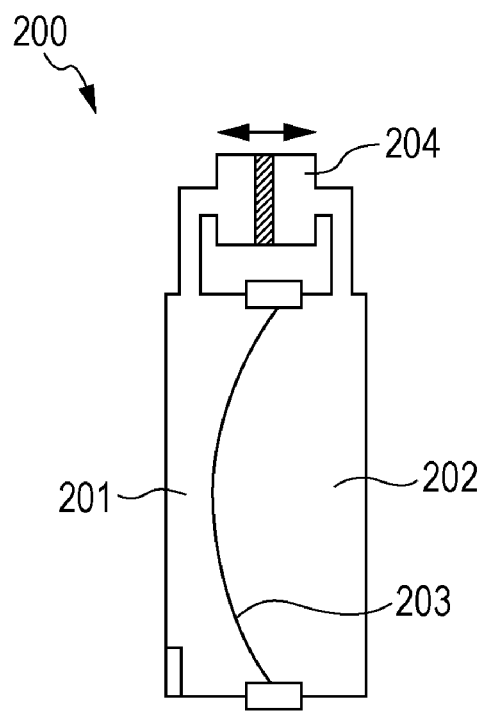

As the first variable refractive power element AO1 and the second variable refractive power element AO2, for example, the variable refractive power elements described in FIGS. 11A and 11B, whose refractive power can be changed by changing the shape of the interface between different media, may be used. Instead of controlling the shape of the interface between two liquids as illustrated in FIGS. 11A and 11B, the shape of the interface between a liquid and air may be controlled. Alternatively, a variable refractive power element whose refractive power is changed by deforming a lens made of a liquid or a gel may be used.

By using such a variable refractive power element, the size of the optical system of the zoom lens can be reduced more easily than in the case where a zoom lens performs zooming by only moving a plurality of lens units. As will be described below, a zoom lens that is configured to increase the imaging magnification of a variable refractive power element and reduce variation in aberration by moving the variable refractive power element during zooming is also within the scope of the present invention.

In the sectional views of the zoom lens, SP denotes an aperture stop, and GB denotes a glass block. IP denotes an image plane, on which, in the case of a digital camera, a solid-state image pickup device such as a CCD or a CMOS is disposed and, in the case of a silver-halide film camera, a silver-halide film is disposed.

A wide angle end and a telephoto end are zooming positions at ends of a zooming range over which lens units for changing magnification are movable along the optical axis within the limit of a mechanism.

In the zoom lens according to each of the embodiments the present invention, the imaging magnification of at least one variable refractive power element with respect to the d-line increases during zooming from the wide angle end to the telephoto end. That is, for at least one variable refractive power element, the absolute value of the ratio $|\beta t/\beta w|$ is larger than 1, where $\beta w$ is the imaging magnification at the wide angle end and $\beta t$ is the imaging magnification at the telephoto end. As used in the instant description, the imaging magnification refers to the imaging magnification of an optical system with respect to the d-line wavelength when the object distance is infinity.

By thus configuring at least one variable refractive power element so that the imaging magnification thereof increases during zooming from the wide angle end to the telephoto end, a high zoom ratio can be realized.

Moreover, by appropriately changing the refractive power of the first variable refractive power element AO1 and the refractive power of the second variable refractive power element AO2 during zooming from the wide angle end to the telephoto end, variation in chromatic aberration can be reduced.

That is, the zoom lens according to each of the embodiments of the present invention satisfies a conditional expression related to the amount of change in the refractive powers of the media of each of the variable refractive power elements during zooming from the wide angle end to the telephoto end and the Abbe numbers of the media, so that variation in chromatic aberration due to the variable refractive power elements is reduced.

The conditional expression for reducing variation in chromatic aberration of the variable refractive power elements will be described.

In general, the chromatic aberration of a lens element is proportional to the refractive power $\phi$ of the lens and the reciprocal $(1/\nu)$ of the Abbe number of the medium of the lens.

Therefore, the amount of change in the chromatic aberration of the first variable refractive power element AO1 including two or more media is represented by $$\Sigma(\Delta\phi 1j/\nu 1j) = \Delta\phi 11/\nu 11 + \Delta\phi 12/\nu 12 + \ldots,$$

where $\Delta\phi 11$, $\Delta\phi 12$, ... are the amounts of change in the refractive powers of the media, and $\nu 11$, $\nu 12$ ... are the Abbe numbers of the media.

Likewise, the amount of change in the chromatic aberration of the second variable refractive power element AO2 including two or more media is represented by $$\Sigma(\Delta\phi 2j/\nu 2j) = \Delta\phi 21/\nu 21 + \Delta\phi 22/\nu 22 + \ldots,$$

where $\Delta\phi 21$, $\Delta\phi 22$, ... are the amounts of change in the refractive powers of the media, and $\nu 21$, $\nu 22$ ... are the Abbe numbers of the media.

The amounts of change in the refractive powers of the media $\Delta\phi 1j$ and $\Delta\phi 2j$, during zooming from the wide angle end to the telephoto end, each are the difference between the refractive power (the reciprocal of the focal length) of the medium at the telephoto end and the refractive power of the medium at the wide angle end. Here, j is an integer equal to or greater than 1 indicative of the order of the medium of the variable refractive power element counted from the side of the variable refractive power element on which light is incident.

The zoom lens according to each of the embodiments of the present invention satisfies the following conditional expression (1) related to the amounts of change in the chromatic aberration of the first variable refractive power element AO1 and the second variable refractive power element AO2.

$$-0.0150 < \{\Sigma(\Delta\phi 1j/\nu 1j) + \Sigma(\Delta\phi 2j/\nu 2j)\} \cdot ft < 0.0075 \quad (1)$$

In conditional expression (1), the amount of change in the chromatic aberration is normalized by using the focal length ft of the total system at the telephoto end.

If conditional expression (1) is not satisfied, variation in chromatic aberration during zooming increases, so that it becomes difficult to appropriately correct the chromatic aberration in the entire zooming range.

If the zoom lens includes a plurality of first variable refractive power elements AO1 and a plurality of second variable refractive power elements AO2, the sum of the amounts of change in the chromatic aberration of the plurality of variable refractive power elements satisfies conditional expression (1).

It is more preferable that the zoom lens satisfy the following conditional expression (1a), so that a zoom lens for which variation in chromatic aberration is further reduced can be realized.

$$-0.0135 < \{\Sigma(\Delta\phi 1j/\nu 1j) + \Sigma(\Delta\phi 2j/\nu 2j)\} \cdot ft < 0.0050 \quad (1a)$$

To realize a zoom lens having a high zoom ratio and a small size, it is necessary that the amounts of change in the refractive powers of the variable refractive power elements of the zoom lens be large to a certain degree. Therefore, if the zoom lens includes only one of the first variable refractive power element and the second variable refractive power element, the amount of change in the chromatic aberration of the variable refractive power element is large in the positive or the negative direction, so that it is difficult to reduce variation in chromatic aberration due to zooming.

For this reason, according to at least one embodiment of the present invention, a zoom lens includes a first variable refractive power element whose refractive power changes in the positive direction during zooming from the wide angle end to the telephoto end and a second variable refractive power element whose refractive power changes in the negative direction during zooming from the wide angle end to the telephoto end. Thus, a zoom lens is realized that satisfies conditional expression (1) and for which variation in chromatic aberration due to zooming is small.

By virtue of the features described above, at least one embodiment of the present invention offers remarkable advantages over conventional variable refractive power elements known in the art. In addition, if any of the conditions described below are satisfied, additional advantageous effects corresponding to each condition can be produced.

Let $\Delta\phi 1$ denote the amount of change in the refractive power of the first variable refractive power element AO1, whose refractive power changes in the positive direction during zooming from the wide angle end to the telephoto end. Let $\Delta\phi 2$ denote the amount of change in the refractive power of the second variable refractive power element AO2, whose refractive power changes in the negative direction during zooming from the wide angle end to the telephoto end. The amount of change in the refractive power of each of the variable refractive power elements during zooming from the wide angle end to the telephoto end is the difference between the refractive power of the variable refractive power element at the telephoto end and the refractive power of the variable refractive power element at the wide angle end.

If there are a plurality of first variable refractive power elements AO1, let $\Delta\phi 1$ min denote the amount of change in the refractive power of one of the first variable refractive power elements AO1 for which the amount of change in the refractive power is the minimum during zooming from the wide angle end to the telephoto end. If there are a plurality of second variable refractive power elements AO2, let $\Delta\phi 2$ min denote the amount of change in the refractive power of one of the second variable refractive power elements AO2 for which amount of change in the refractive power is the minimum during zooming from the wide angle end to the telephoto end.

If there is only one first variable refractive power element AO1, let $\Delta\phi 1$ min denote the amount of change in the refractive power of the first variable refractive power element. Likewise, if there is only one second variable refractive power element AO2, let $\Delta\phi 2$ min denote the amount of change in the refractive power of the second variable refractive power element. In this case, the following conditional expressions may be satisfied.

$$0.05 < |\Delta\phi 1 \text{min} \cdot \sqrt{(fw \cdot ft)}| < 0.50 \quad (2)$$

$$0.05 < |\Delta\phi 2 \text{min} \cdot \sqrt{(fw \cdot ft)}| < 0.50 \quad (3)$$

where the notation "$\sqrt{(a)}$" indicates the square root of a.

If the lower limit of conditional expressions (2) or (3) is not satisfied, the amount of change in the refractive power of the variable refractive power element is too small so that it is difficult to realize a high zoom ratio. If the upper limit of conditional expressions (2) or (3) is not satisfied, the amount of change in the refractive power of the variable refractive power element is too large so that it is difficult to reduce variation in chromatic aberration.

It is more preferable that the following conditional expressions (2a) and (3a) be satisfied. In this case, a zoom lens having a higher zoom ratio is easily obtained.

$$0.09 < |\Delta\phi 1 \text{min} \cdot \sqrt{(fw \cdot ft)}| < 0.50 \quad (2a)$$

$$0.09 < |\Delta\phi 2 \text{min} \cdot \sqrt{(fw \cdot ft)}| < 0.50 \quad (3a)$$

It is preferable that the zoom lens include a lens unit whose refractive power does not change during zooming from the wide angle end to the telephoto end and the imaging magnification of the lens unit increase during zooming from the wide angle end to the telephoto end. In this case, a high zoom ratio is easily obtained.

It is preferable that at least one variable refractive power element satisfies the following conditional expressions (4) and (5), where vdmax and Ndmax are respectively the Abbe number and the refractive index of a medium of the variable refractive power element having the highest refractive index.

$$28 < \nu d\text{max} < 55 \quad (4)$$

$$1.55 < Nd\text{max} \quad (5)$$

If any one of the upper limit and the lower limit of conditional expression (4) is not satisfied, the amount of variation in chromatic aberration generated in the variable refractive power element becomes large.

If the refractive index of the medium is lower than the lower limit of conditional expression (5), a required change in the refractive power is not achieved, so that it is difficult to realize a high zoom ratio.

Let f1 denote the focal length, at the wide angle end, of an optical system from a lens disposed closest to the object side to a lens disposed adjacent to the object side of the first variable refractive power element AO1. Let f2 denote the focal length, at the wide angle end, of an optical system from a lens disposed closest to the object side to a lens adjacent to the object side of the second variable refractive power element AO2. In this case, the following conditional expressions may be satisfied.

$$-2.0 < f1/\sqrt{(fw \cdot ft)} < -0.5 \quad (6)$$

$$0.1 < f2/\sqrt{(fw \cdot ft)} < 2.5 \quad (7)$$

The conditional expression (6) corresponds to the fact that a light beam that is incident on the first variable refractive power element AO1 is a divergent light beam. If the lower limit of conditional expression (6) is not satisfied, it is difficult to increase the imaging magnification by changing the refractive power of the first variable refractive power element AO1, that is, to obtain a high zoom ratio. If the upper limit of conditional expression (6) is not satisfied, it is difficult to correct the chromatic aberration, which is undesirable.

The conditional expression (7) corresponds to the fact that a light beam that is incident on the second variable refractive power element AO2 is a convergent light beam. If the lower limit of conditional expression (7) is not satisfied, it is difficult to correct the chromatic aberration, which is undesirable. If the upper limit of conditional expression (7) is not satisfied, it is difficult to increase the imaging magnification by changing the refractive power of the second variable refractive power element AO2, that is, to obtain a high zoom ratio.

It is more preferable that the following conditional expressions (6a) and (7a) be satisfied.

$$-1.2 < f1 \cdot \sqrt{}/(fw \cdot ft) < -0.6 \tag{6a}$$

$$0.3 < f2 \cdot \sqrt{}/(fw \cdot ft) < 1.1 \tag{7a}$$

It is preferable that, if the zoom lens includes a plurality of first variable refractive power elements AO1, each of the first variable refractive power elements AO1 satisfy conditional expression (6) or (6a). Likewise, it is preferable that, if there are a plurality of second variable refractive power elements AO2, each of the second variable refractive power elements AO2 satisfy conditional expression (7) or (7a).

It is preferable that at least one of the first variable refractive power element and the second variable refractive power element be included in at least a part of lens units that move during zooming from the wide angle end to the telephoto end. By moving the variable refractive power element during zooming, the imaging magnification is easily increased and the variation in the aberration during zooming is easily reduced.

First Embodiment

Figure 1:
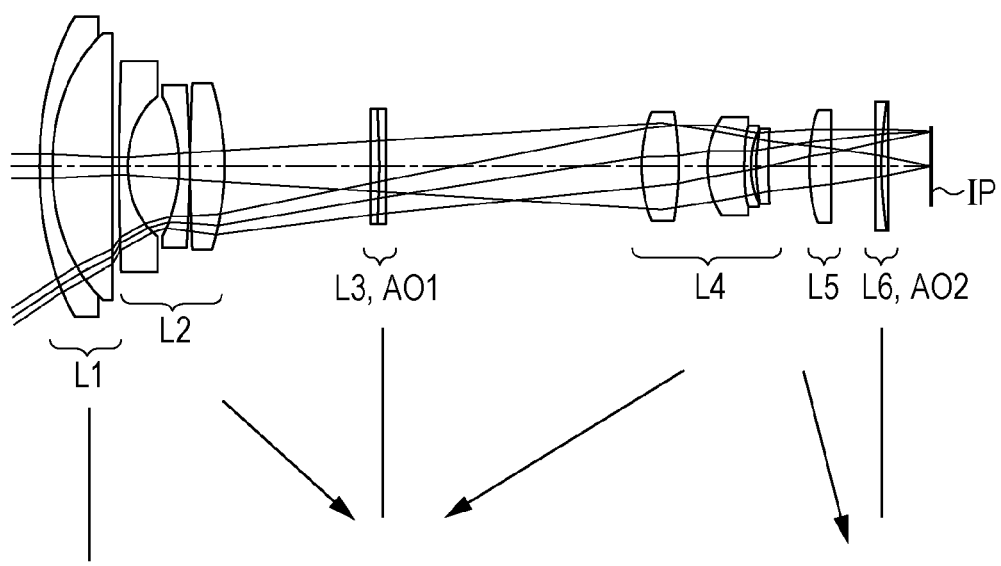
FIG. 1 is a sectional view of a zoom lens according to a first embodiment of the present invention.
Figure 2A:
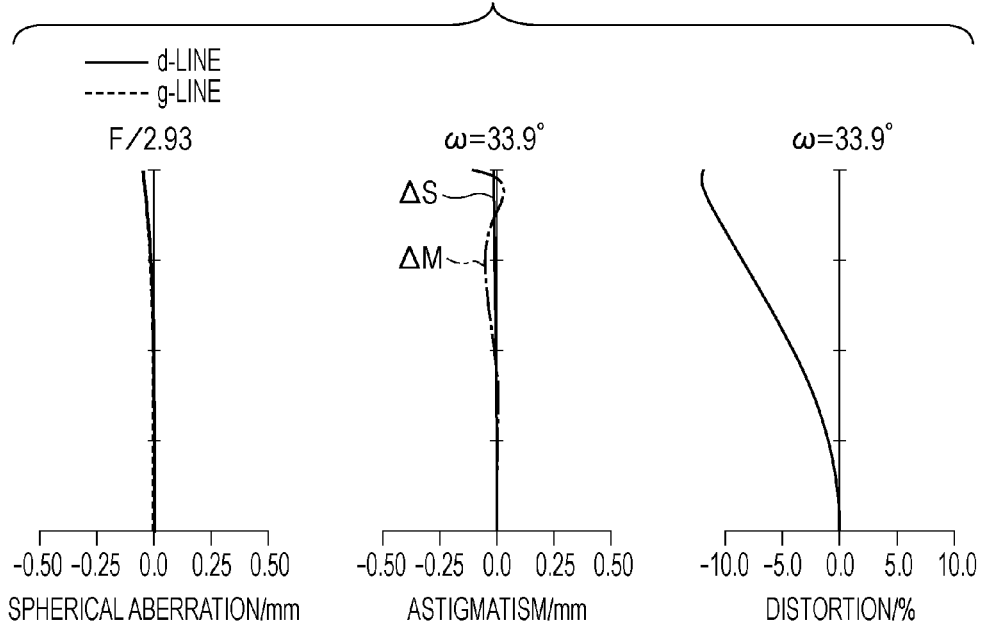
FIGS. 2A and 2B are aberration charts of the zoom lens according to the first embodiment of the present invention.
Figure 2B:
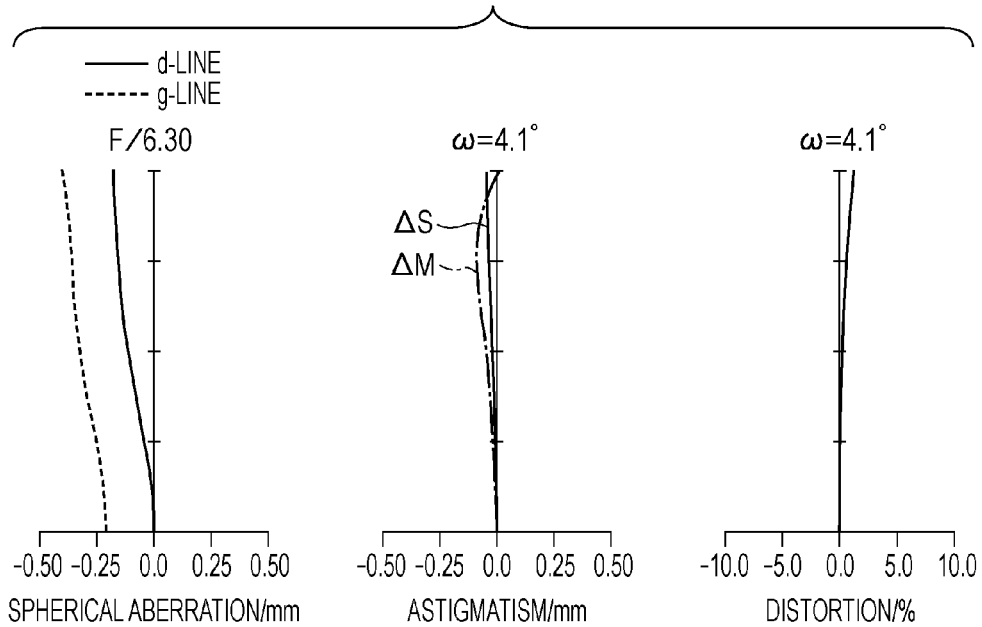

Referring to FIG. 1, a zoom lens according to a first embodiment of the present invention will be described.

The zoom lens according to the first embodiment includes, in order from the object side to the image side, a first lens unit L1 having a positive refractive power, a second lens unit L2 having a negative refractive power, a third lens unit L3, a fourth lens unit L4 having a positive refractive power, a fifth lens unit L5 having a positive refractive power, and a sixth lens unit L6. The third lens unit L3 includes a first variable refractive power element AO1, and the sixth lens unit L6 includes a second variable refractive power element AO2.

During zooming from the wide angle end to the telephoto end, the first lens unit L1, the third lens unit L3 (first variable refractive power element AO1), and the sixth lens unit L6 (second variable refractive power element AO2) do not move, i.e., remain stationary.

During zooming from the wide angle end to the telephoto end, the imaging magnification of the second lens unit L2 is increased by about 2.0 times by moving the second lens unit L2 toward the image side.

During zooming from the wide angle end to the telephoto end, the refractive powers of the first variable refractive power element AO1 and the second variable refractive power element AO2 are changed so that the imaging magnifications thereof increase.

During zooming from the wide angle end to the telephoto end, the imaging magnification of the first variable refractive power element AO1 increases by 1.44 times from 0.89 to 1.28. The imaging magnification of the second variable refractive power element AO2 increases by 1.04 times from 0.97 to 1.01. The imaging magnifications of the variable refractive power elements are those with respect to the d-line.

With the structure described above, a high zoom ratio of about 9.5 times is realized.

Focusing is performed by moving the fifth lens unit L5.

Each of the first and second variable refractive power elements AO1 and AO2 includes an electrolytic solution on the object side thereof and a non-electrolytic solution on the image side thereof. The electrolytic solution in each of the first and second variable refractive power elements AO1 and AO2 is water (refractive index Nd=1.33, Abbe number vd=55.7). The non-electrolytic solution in the first variable refractive power element AO1 is an oily medium with refractive index Nd=1.65 and Abbe number vd=42.7. The non-electrolytic solution in the second variable refractive power element AO2 is an oily medium for which Nd=1.58 and vd=46.2. Thus, the media do not mix in each of the variable refractive power elements.

Regarding the first variable refractive power element AO1, the refractive index of the oily medium on the image side is higher than that of water on the object side, and the radius of curvature of the interface changes from negative to positive. Therefore, the refractive power of the first variable refractive power element AO1 changes from negative to positive. Regarding the second variable refractive power element AO2, the refractive index of the oily medium on the image side is higher than that of water on the object side, and the radius of curvature of the interface changes from positive to negative. Therefore, the refractive power of the second variable refractive power element AO2 changes from positive to negative. Thus, the refractive power of the first variable refractive power element AO1 and the refractive power of the second variable refractive power element AO2 are changed in opposite directions, whereby variation in chromatic aberration during zooming is reduced.

Second Embodiment

Figure 3:
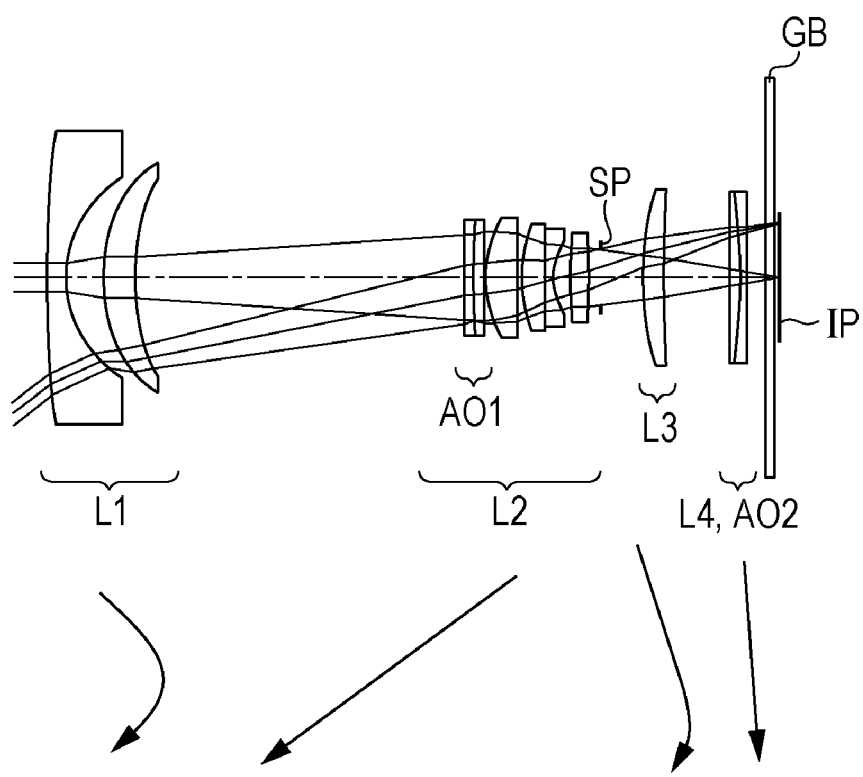
FIG. 3 is a sectional view of a zoom lens according to a second embodiment of the present invention.

Referring to FIG. 3, a zoom lens according to a second embodiment of the present invention will be described.

The zoom lens according to the second embodiment includes, in order from the object side to the image side, a first lens unit L1 having a negative refractive power, a second lens unit L2, a third lens unit L3 having a positive refractive power, and a fourth lens unit L4. The second lens unit L2 includes a first variable refractive power element AO1 and a plurality of lenses, and the fourth lens unit L4 includes a second variable refractive power element AO2.

During zooming from the wide angle end to the telephoto end, the second lens unit L2 including the first variable refractive power element AO1 moves toward the object side. The imaging magnification is increased by moving the third lens unit L3 toward the image side. Moreover, during zooming from the wide angle end to the telephoto end, the refractive power of the first variable refractive power element AO1 included in the second lens unit L2 and the refractive power of the second variable refractive power element AO2 included in the fourth lens unit L4 are changed so that the imaging magnifications thereof increase.

During zooming from the wide angle end to the telephoto end, the imaging magnification of the first variable refractive power element AO1 increases by 1.30 times from 0.79 to 1.03. The imaging magnification of the second variable refractive power element AO2 increases by 1.04 times from 0.98 to 1.02. Here, the imaging magnifications of the variable refractive power elements are those with respect to the d-line.

With the structure described above, a high zoom ratio of about 4.8 times is realized.

Focusing is performed by moving the third lens unit L3.

Each of the first and second variable refractive power elements AO1 and AO2 includes an electrolytic solution on the object side thereof and a non-electrolytic solution on the image side thereof. The electrolytic solution in each of the first and second variable refractive power elements AO1 and AO2 is water (Nd=1.33, vd=55.7). The non-electrolytic solution in the first variable refractive power element AO1 is an oily medium for which Nd=1.65 and vd=33.4. The non-electrolytic solution in the second variable refractive power element AO2 is an oily medium for which Nd=1.65 and vd=29.6. Thus, the media do not mix in each of the variable refractive power elements.

Regarding the first variable refractive power element AO1, the refractive index of the oily medium on the object side is higher than that of water on the image side, and the radius of curvature of the interface changes from positive to negative. Therefore, the refractive power of the first variable refractive power element AO1 changes from negative to positive. Regarding the second variable refractive power element AO2, the refractive index of the oily medium on the object side is higher than that of water on the image side, and the radius of curvature of the interface changes from negative to positive. Therefore, the refractive power of the second variable refractive power element AO2 changes from positive to negative. Thus, the refractive power of the first variable refractive power element AO1 and the refractive power of the second variable refractive power element AO2 are changed in opposite directions, whereby variation in chromatic aberration during zooming is reduced.

Third Embodiment

Figure 5:
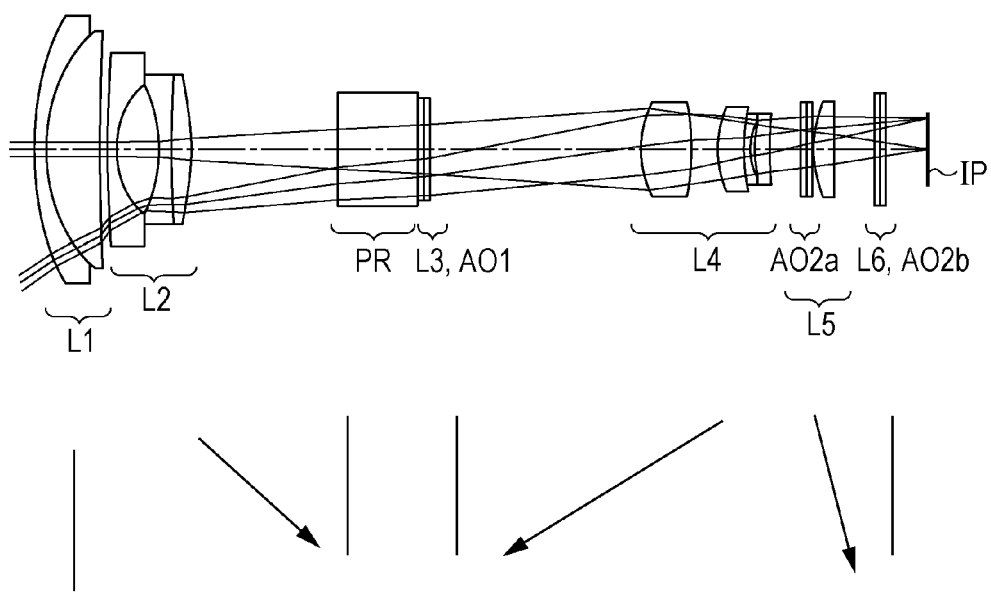
FIG. 5 is a sectional view of a zoom lens according to a third embodiment of the present invention.
Figure 6A:
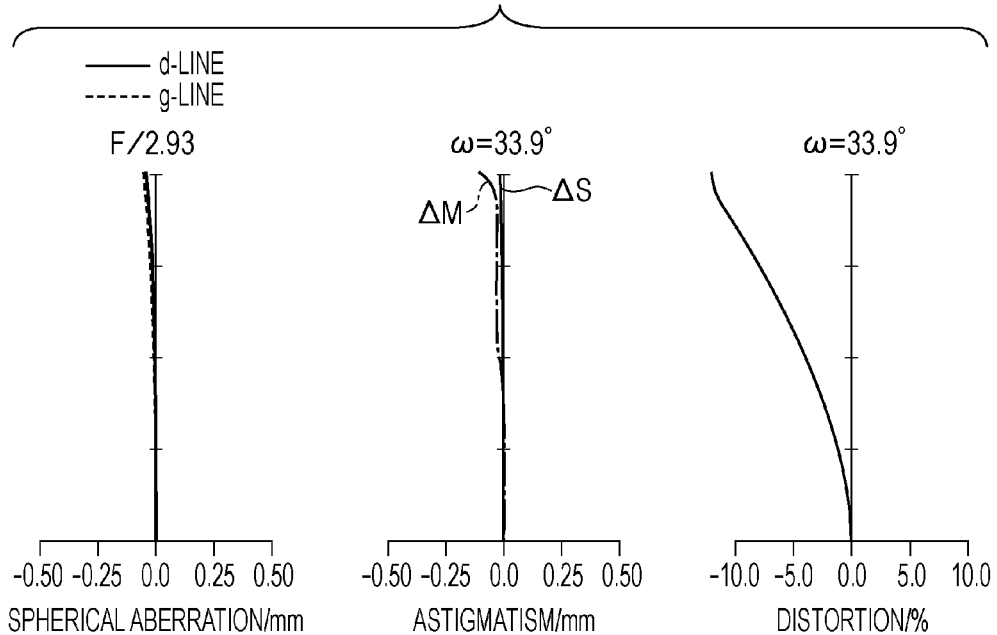
FIGS. 6A and 6B are aberration charts of the zoom lens according to the third embodiment of the present invention.
Figure 6B:
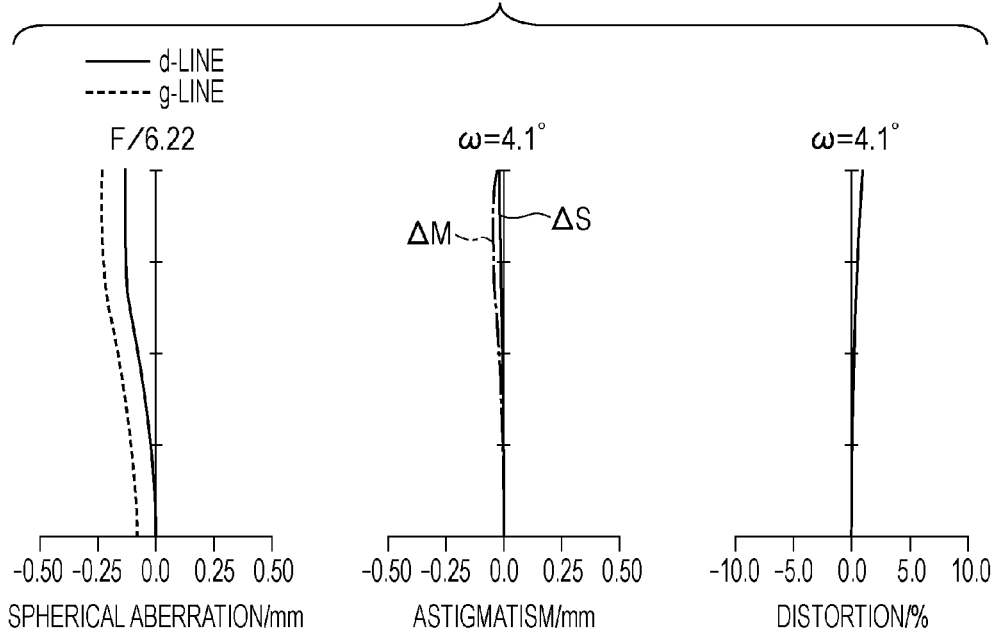

Referring to FIG. 5, a zoom lens according to a third embodiment of the present invention will be described.

The zoom lens according to the third embodiment includes, in order from the object side to the image side, a first lens unit L1 having a positive refractive power, a second lens unit L2 having a negative refractive power, a prism PR, a third lens unit L3, a fourth lens unit L4 having a positive refractive power, a fifth lens unit L5, and a sixth lens unit L6. The third lens unit L3 includes a first variable refractive power element AO1, the fifth lens unit L5 includes a second variable refractive power element AO2$a$ and a positive lens, and the sixth lens unit L6 includes a third variable refractive power element AO2$b$.

During zooming from the wide angle end to the telephoto end, the first lens unit L1, the prism PR, the third lens unit L3 (first variable refractive power element AO1), and the sixth lens unit L6 (third variable refractive power element AO2$b$) do not move.

During zooming from the wide angle end to the telephoto end, the imaging magnification of the second lens unit L2 is increased by about 2.0 times by moving the second lens unit L2 toward the image side. Moreover, the fifth lens unit L5 including the second variable refractive power element AO2$a$ is moved toward the image side. Furthermore, the refractive power of the first variable refractive power element AO1 included in the third lens unit L3 and the refractive powers of the second variable refractive power element AO2$a$ and the third variable refractive power element AO2$b$ respectively included in the fifth and sixth lens units L5 and L6 are changed so that the imaging magnifications thereof increase.

During zooming from the wide angle end to the telephoto end, the imaging magnification of the first variable refractive power element AO1 increases by 1.43 times from 1.04 to 1.49. The imaging magnification of the second variable refractive power element AO2$a$ increases by 1.08 times from 0.98 to 1.06. The imaging magnification of the third variable refractive power element AO2$b$ increases by 1.03 times from 1.00 to 1.03. Here, the imaging magnifications of the variable refractive power elements are those with respect to the d-line.

With the structure described above, a high zoom ratio of about 9.5 times is realized.

Focusing is performed by moving the fifth lens unit L5 including the second variable refractive power element AO2$a$.

Each of the first variable refractive power element AO1, the second variable refractive power element AO2$a$, and the third variable refractive power element AO2$b$ includes an electrolytic solution on the object side thereof and a non-electrolytic solution on the image side thereof. The electrolytic solution in each of the variable refractive power elements is water (Nd=1.33, vd=55.7). The non-electrolytic solution in each of the variable refractive power elements is an oily medium for which Nd=1.74 and vd=40.0. Thus, the media do not mix in each of the variable refractive power elements.

In the first variable refractive power element AO1, the refractive index of the oily medium on the object side is higher than that of water on the image side, and the positive radius of curvature of the interface decreases. Therefore, the positive refractive power of the first variable refractive power element AO1 increases. In each of the second variable refractive power element AO2$a$ and the third variable refractive power element AO2$b$, the refractive index of the oily medium on the image side is higher than that of water on the object side, and the radius of curvature of the interface changes from positive to negative. Therefore, the refractive powers of the second variable refractive power element AO2$a$ and the third variable refractive power element AO2$b$ change from positive to negative. Thus, the refractive power of the first variable refractive power element AO1 and the refractive powers of the second and third variable refractive power elements AO2$a$ and AO2$b$ are changed in opposite directions, whereby variation in chromatic aberration during zooming is reduced.

Fourth Embodiment

Figure 7:
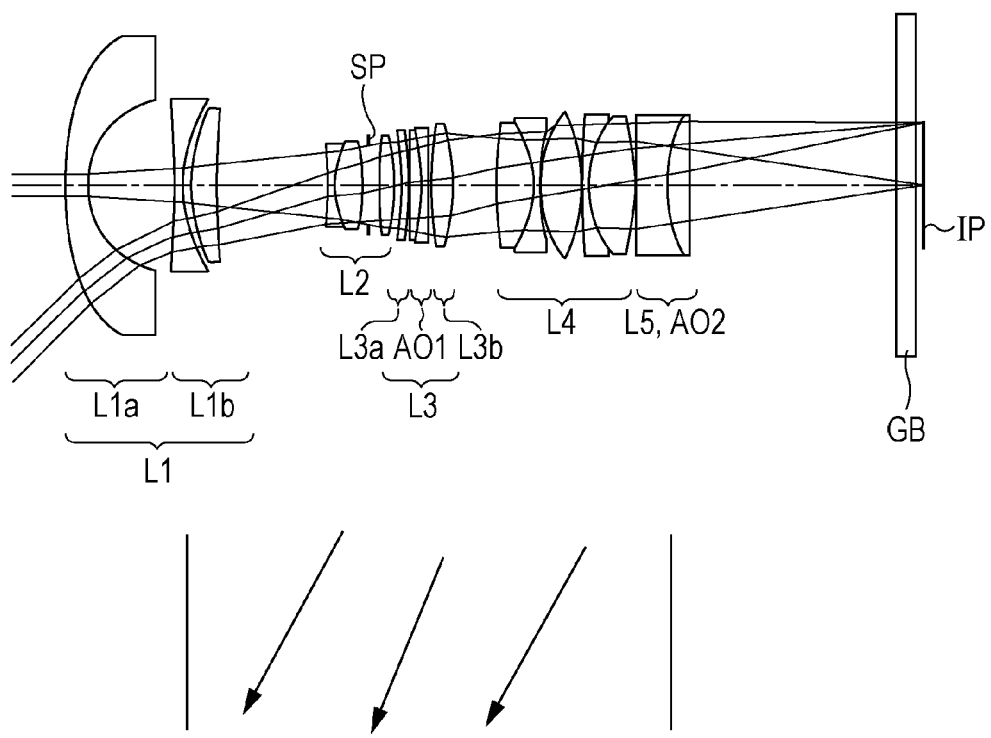
FIG. 7 is a sectional view of a zoom lens according to a fourth embodiment of the present invention.

Referring to FIG. 7, a zoom lens according to a fourth embodiment of the present invention will be described.

The zoom lens according to the fourth embodiment includes, in order from the object side to the image side, a first lens unit L1 having a negative refractive power, a second lens unit L2 having a positive refractive power, a third lens unit L3, a fourth lens unit L4 having a positive refractive power, and a fifth lens unit L5. The third lens unit L3 includes a 3-$a$ lens unit L3$a$, a first variable refractive power element AO1, and a 3-$b$ lens unit L3$b$. The fifth lens unit L5 includes a second variable refractive power element AO2.

In the fourth embodiment, during zooming from the wide angle end to the telephoto end, the first lens unit L1 and the fifth lens unit L5 (second variable refractive power element AO2) do not move.

During zooming from the wide angle end to the telephoto end, the imaging magnification of the fourth lens unit L4 is increased by about 1.2 times by moving the fourth lens unit L4 toward the object side. Moreover, the refractive power of the first variable refractive power element AO1, which is disposed between the 3-$a$ lens unit L3$a$ and the 3-$b$ lens unit L3$b$, and the refractive power of the second variable refractive power element AO2, which is included in the fifth lens unit L5, are changed so that the imaging magnifications thereof increase.

During zooming from the wide angle end to the telephoto end, the imaging magnification of the first variable refractive power element AO1 increases by 1.32 times from 0.66 to 0.87. The imaging magnification of the second variable refractive power element AO2 increases by 1.95 times from 0.72 to 1.40. Here, the imaging magnifications of the variable refractive power elements are those with respect to the d-line.

With the structure described above, a super-wide-angle lens having a high zoom ratio of about 2.1 times is realized.

The first lens unit L1 includes, in order from the object side to the image side, a 1-a lens unit L1a and a 1-b lens unit L1b. Focusing is performed by moving the 1-b lens unit L1b.

Each of the first and second variable refractive power elements AO1 and AO2 includes an electrolytic solution on the object side thereof and a non-electrolytic solution on the image side thereof. The electrolytic solution in each of the first and second variable refractive power elements AO1 and AO2 is water (Nd=1.33, vd=55.7). The non-electrolytic solution in the first variable refractive power element AO1 is an oily medium for which Nd=1.73 and vd=40.0. The non-electrolytic solution in the second variable refractive power element AO2 is an oily medium for which Nd=1.48 and vd=54.6.

Regarding the first variable refractive power element AO1, the refractive index of the oily medium on the image side is higher than that of water on the object side, and the negative radius of curvature of the interface increases. Therefore, the negative refractive power of the first variable refractive power element AO1 decreases. Regarding the second variable refractive power element AO2, the refractive index of the oily medium on the image side is higher than that of water on the object side, and the radius of curvature of the interface changes from positive to negative. Therefore, the refractive power of the second variable refractive power element AO2 changes from positive to negative. Thus, the refractive power of the first variable refractive power element AO1 and the refractive power of the second variable refractive power element AO2 are changed in opposite directions, whereby variation in chromatic aberration during zooming is reduced.

Fifth Embodiment

Figure 9:
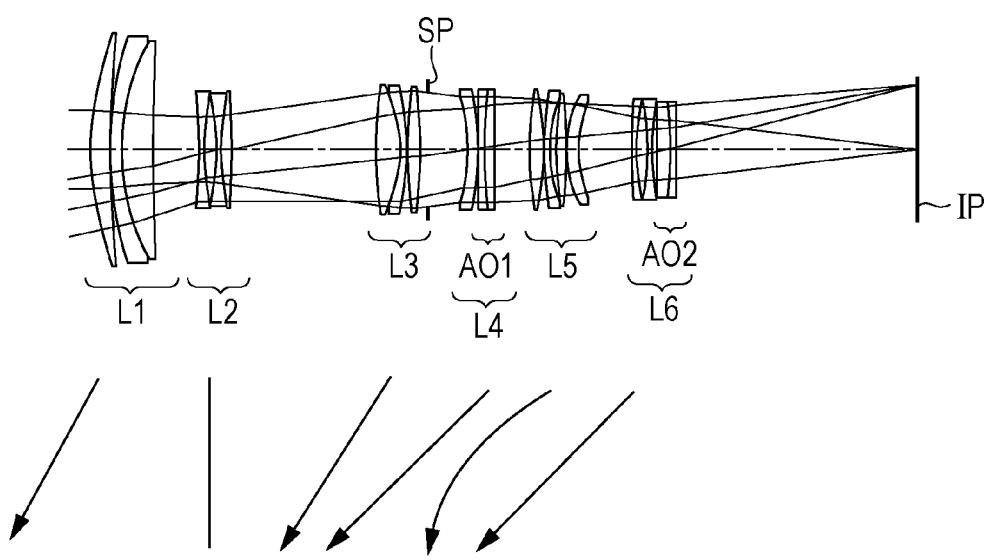
FIG. 9 is a sectional view of a zoom lens according to a fifth embodiment of the present invention.
Figure 10A:
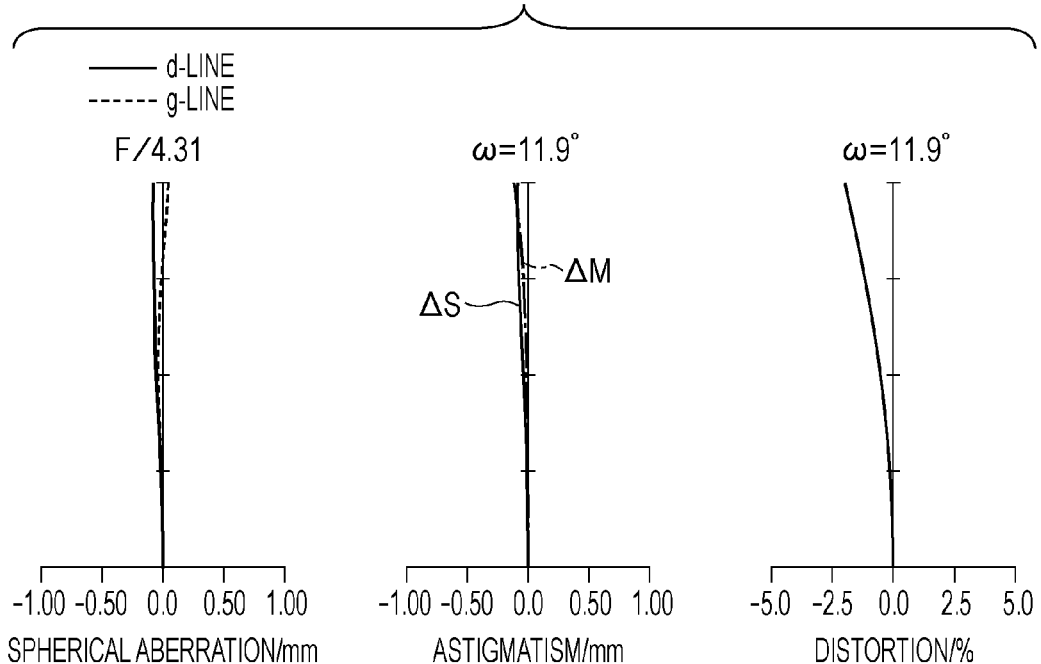
FIGS. 10A and 10B are aberration charts of the zoom lens according to the fifth embodiment of the present invention.
Figure 10B:
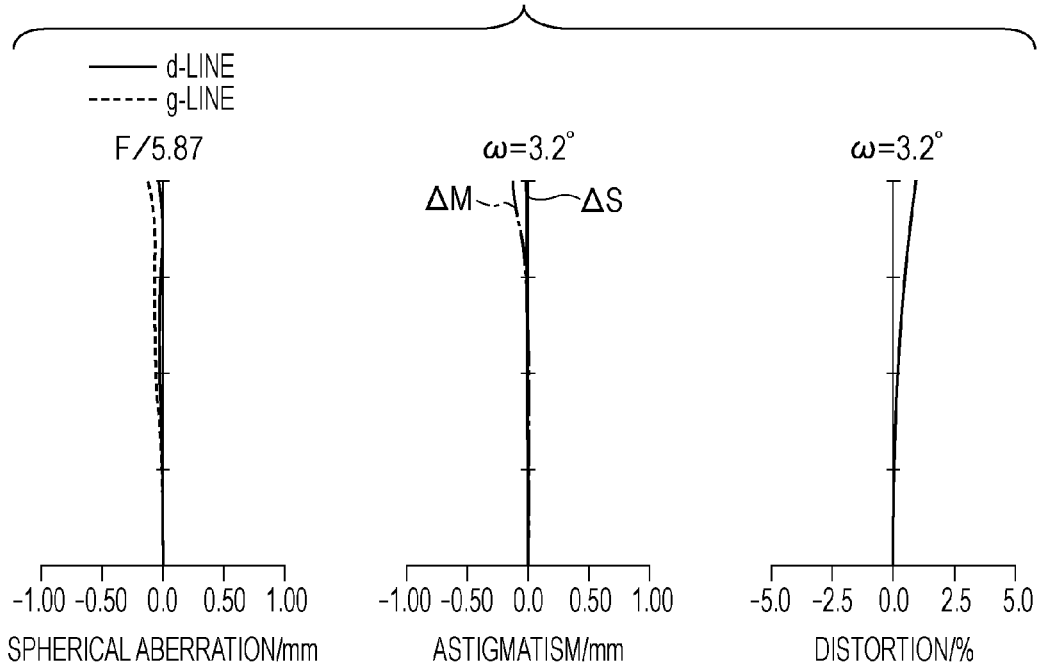

Referring to FIG. 9, a zoom lens according to a fifth embodiment of the present invention will be described.

The zoom lens according to the fifth embodiment includes, in order from the object side to the image side, a first lens unit L1 having a positive refractive power, a second lens unit L2 having a negative refractive power, a third lens unit L3 having a positive refractive power, a fourth lens unit L4, a fifth lens unit L5 having a positive refractive power, and a sixth lens unit L6. The fourth lens unit L4 includes a negative lens and a first variable refractive power element AO1, and the sixth lens unit L6 includes two negative lenses and a second variable refractive power element AO2.

In the present embodiment, during zooming from the wide angle end to the telephoto end, the second lens unit L2 does not move.

During zooming from the wide angle end to the telephoto end, the first lens unit L1, the third lens unit L3, the fourth lens unit L4, the fifth lens unit L5, and the sixth lens unit L6 are moved toward the object side. The refractive power of the first variable refractive power element AO1 included in the fourth lens unit L4 is changed so that the imaging magnification decreases. The refractive power of the second variable refractive power element AO2 included in the sixth lens unit is changed so that the imaging magnification decreases. During zooming from the wide angle end to the telephoto end, the imaging magnification of the first variable refractive power element AO1 decreases by 0.96 times from 0.56 to 0.54. The imaging magnification of the second variable refractive power element AO2 increases by about 1.31 times from 1.01 to 1.33. Here, the imaging magnifications of the variable refractive power elements are those with respect to the d-line.

With the structure described above, a super-telephoto lens having a high zoom ratio of about 3.8 times is realized.

Focusing is performed by moving the second lens unit L2.

Each of the first and second variable refractive power elements AO1 and AO2 includes an electrolytic solution on the object side thereof and a non-electrolytic solution on the image side thereof. The electrolytic solution in each of the first and second variable refractive power elements AO1 and AO2 is water (Nd=1.33, vd=55.7). The non-electrolytic solution in the first variable refractive power element AO1 is an oily medium for which Nd=1.56 and vd=38.3. The non-electrolytic solution in the second variable refractive power element AO2 is an oily medium for which Nd=1.48 and vd=54.6.

Regarding the first variable refractive power element AO1, the refractive index of the oily medium on the image side is higher than that of water on the object side, and the positive radius of curvature of the interface decreases. Therefore, the positive refractive power of the first variable refractive power element AO1 increases. Regarding the second variable refractive power element AO2, the refractive index of the oily medium on the image side is higher than that of water on the object side, and the absolute value of the negative radius of curvature of the interface decreases. Therefore, the negative refractive power of the second variable refractive power element AO2 increases. Thus, the refractive power of the first variable refractive power element AO1 and the refractive power of the second variable refractive power element AO2 are changed in opposite directions, whereby variation in chromatic aberration during zooming is reduced.

In each of the aberration charts (FIGS. 2A, 2B, 4A, 4B, 6A, 6B, 8A, 8B, 10A and 10B), "d" and "g" respectively denote d-line light and g-line light. "ΔM" and "ΔS" respectively denote a meridional image plane and a sagittal image plane. Chromatic aberration of magnification is represented with respect to g-line light. "ω" denotes a half angle of view, and "Fno" denotes an F-number.

In each of the zoom lenses according to the first to fifth embodiments, the diameter of the aperture stop SP may be changed in order to reduce the variation in F number during zooming. If an image pickup apparatus including an image pickup device for converting an optical image formed on a light-receiving surface into an electrical signal is used, electrical correction may be performed in accordance with the amount of distortion.

In the zoom lens of each of the embodiments, the imaging magnifications of both of the first variable refractive power element and the second variable refractive power element increase, or one of the imaging magnifications increases and the other of the imaging magnifications decreases. However, in the zoom lens, one of the imaging magnifications may increase and the other of the imaging magnifications need not change.

Heretofore, embodiments of the present invention have been described. However, the present invention is not limited to these embodiments, and can be modified within the spirit and scope thereof.

Data for each embodiment will be described below. i (where i is an integer equal to or greater than 1) denotes the order of a surface from the object side, ri denotes the radius of curvature of the i-th optical surface, di denotes a lens thickness or an air distance between the i-th surface and the (i+1)-th surface, and ndi and vdi respectively denote the refractive index and the Abbe number with respect to the d-line. Regarding the radius of curvature of an optical surface, a positive radius of curvature corresponds to a case where the center of curvature of the optical surface is on the image side of the optical surface, and a negative radius of curvature corresponds to a case where the center of curvature of the optical surface is on the object side of the optical surface.

Where used (e.g., FIGS. 3 and 7), a glass block GB, which is disposed on the image side of the lens unit closest to the image plane IP, is a CCD protection glass, an optical low-pass filter, or the like. When a given i-th surface is an aspheric surface, the surface number is denoted with an asterisk (*), and k, A, B, C, D, E, etc., are aspheric coefficients.

An aspheric shape of a given aspheric surface is represented by the following equation $$x=(h^2/R)/[1+\{1-(1+k)(h/R)^2\}^{1/2}]+Ah^4+Bh^6+Ch^8+Dh^{10}+Eh^{12},$$

where x is a displacement in the optical axis direction with respect to the vertex of the surface at a height h from the optical axis, and R is the radius of curvature.

NUMERIC EXAMPLE 1

Unit mm

Surface data

| Surface number i | ri | di | ndi | vdi | Effective diameter |
|---|---|---|---|---|---|
| 1 | 28.479 | 1.20 | 1.84666 | 23.8 | 25.75 |
| 2 | 17.564 | 5.48 | 1.77250 | 49.6 | 22.80 |
| 3 | 6873.853 | (variable) | | | 21.95 |
| 4 | 147.858 | 0.80 | 1.88300 | 40.8 | 16.84 |
| 5 | 8.515 | 4.59 | | | 12.59 |
| 6* | −18.084 | 1.00 | 1.88300 | 40.8 | 12.39 |
| 7* | 143.569 | 0.10 | | | 12.82 |
| 8 | 380.124 | 3.03 | 1.94595 | 18.0 | 12.91 |
| 9 | −26.866 | (variable) | | | 13.12 |
| 10 | ∞ | 0.61 | 1.33304 | 55.7 | 9.00 |
| 11 | (variable) | 0.64 | 1.65294 | 42.8 | 8.89 |
| 12 | ∞ | (variable) | | | 8.78 |
| 13* | 12.178 | 3.50 | 1.49700 | 81.5 | 7.65 |
| 14 | −27.439 | 2.50 | | | 8.43 |
| 15 | 7.898 | 3.39 | 1.49700 | 81.5 | 7.39 |
| 16 | 20.614 | 0.60 | 2.00330 | 28.3 | 6.09 |
| 17 | 6.609 | 0.40 | | | 5.71 |
| 18 | 16.233 | 1.15 | 1.72825 | 28.5 | 5.71 |
| 19 | 38.772 | (variable) | | | 5.70 |
| 20* | 17.363 | 1.97 | 1.45600 | 90.3 | 8.66 |
| 21 | 344.622 | (variable) | | | 8.55 |
| 22 | ∞ | 0.55 | 1.33304 | 55.7 | 10.00 |
| 23 | (variable) | 0.55 | 1.58068 | 46.2 | 10.00 |
| 24 | ∞ | | | | 10.00 |
| Image plane | | | | | |

Aspheric data

6th surface

K = 0.00000e+000  A4 = −6.02345e−004  A6 = 1.34031e−005
A8 = −1.91200e−007  A10 = 1.56592e−009

7th surface

K = −3.21679e+003  A4 = −4.54896e−004  A6 = 1.01416e−005
A8 = −1.29730e−007  A10 = 1.05351e−009

13th surface

K = 1.05797e+000  A4 = −1.74178e−004  A6 = −1.08865e−006
A8 = −5.81524e−009

20th surface

K = 9.63774e+000  A4 = −2.50683e−004  A6 = 5.21092e−007
A8 = −4.99622e−007  A10 = 2.55173e−009

Unit mm

Miscellaneous data
Zoom ratio 9.45

| | f | intermediate | telephoto |
|---|---|---|---|
| Focal length | 5.20 | 16.08 | 49.14 |
| F number | 2.93 | 3.93 | 6.30 |
| Angle of view | 33.9 | 12.3 | 4.1 |
| Image height | 3.50 | 3.50 | 3.50 |
| Entire length of lens | 80.75 | 80.75 | 80.75 |
| BF | 4.04 | 4.04 | 4.04 |
| d3 | 0.55 | 9.03 | 13.24 |
| d9 | 13.34 | 4.86 | 0.65 |
| d12 | 23.05 | 14.50 | 1.97 |
| d19 | 3.73 | 15.26 | 26.79 |
| d21 | 3.99 | 1.00 | 2.01 |
| d24 | 4.07 | 5.33 | 23.28 |
| r11 | −84.67 | −1423.26 | 35.80 |
| d10 | 0.61 | 0.53 | 0.34 |
| d11 | 0.64 | 0.72 | 0.91 |
| r23 | 35.15 | 91.55 | −75.00 |
| d22 | 0.55 | 0.69 | 0.88 |
| d23 | 0.55 | 0.41 | 0.22 |
| Entrance pupil position | 17.72 | 41.01 | 52.15 |
| Exit pupil position | −21.48 | −54.88 | −113.40 |
| Front principal point position | 21.86 | 52.70 | 80.76 |
| Rear principal point position | −1.13 | −12.08 | −44.90 |

Zoom lens unit data

| Unit | Initial surface | Focal length | Lens unit length | Front principal point position | Rear principal point position |
|---|---|---|---|---|---|
| 1 | 1 | 39.24 | 6.68 | −0.12 | −3.86 |
| 2 | 4 | −9.14 | 9.52 | 0.32 | −7.51 |
| 3 | 10 | −264.68 | 1.25 | 0.46 | −0.39 |
| 4 | 13 | 17.56 | 11.53 | −5.41 | −10.05 |
| 5 | 20 | 40.02 | 1.97 | −0.07 | −1.42 |
| 6 | 22 | 141.94 | 1.10 | 0.41 | −0.35 |

Single lens data

| Lens | Initial surface | Focal length |
|---|---|---|
| 1 | 1 | −57.00 |
| 2 | 2 | 22.79 |
| 3 | 4 | −10.26 |
| 4 | 6 | −18.14 |
| 5 | 8 | 26.62 |
| 6 | 10 | 254.24 |
| 7 | 11 | −129.68 |
| 8 | 13 | 17.48 |
| 9 | 15 | 23.67 |
| 10 | 16 | −9.91 |
| 11 | 18 | 37.54 |
| 12 | 20 | 40.02 |
| 13 | 22 | −105.54 |
| 14 | 23 | 60.53 |

NUMERIC EXAMPLE 2

Unit mm

Surface data

| Surface number i | ri | di | ndi | vdi | Effective diameter |
|---|---|---|---|---|---|
| 1* | 822.436 | 1.10 | 1.86400 | 40.6 | 14.40 |
| 2* | 6.178 | 1.95 | | | 10.70 |
| 3 | 8.151 | 1.80 | 1.94595 | 18.0 | 11.30 |
| 4 | 11.485 | (variable) | | | 10.70 |

-continued

Unit mm

| | | | | | |
|---|---|---|---|---|---|
| 5 | ∞ | (variable) | 1.64600 | 33.4 | 5.20 |
| 6 | (variable) | (variable) | 1.33304 | 55.8 | 5.20 |
| 7 | ∞ | 0.10 | | | 5.20 |
| 8* | 5.918 | 1.80 | 1.85135 | 40.1 | 5.50 |
| 9 | 64.692 | 0.23 | | | 5.20 |
| 10 | 7.646 | 1.30 | 1.71999 | 50.2 | 4.90 |
| 11 | −106.751 | 0.50 | 1.84666 | 23.8 | 4.50 |
| 12 | 3.885 | 0.94 | | | 4.00 |
| 13 | 27.578 | 1.00 | 1.74950 | 35.3 | 4.00 |
| 14 | −29.647 | 0.58 | | | 4.00 |
| 15(aperture) | ∞ | (variable) | | | 2.99 |
| 16* | 18.844 | 1.20 | 1.69350 | 53.2 | 8.30 |
| 17 | 67.088 | (variable) | | | 8.30 |
| 18 | ∞ | (variable) | 1.65400 | 29.6 | 8.00 |
| 19 | (variable) | (variable) | 1.33304 | 55.8 | 8.00 |
| 20 | ∞ | 1.00 | | | 8.00 |
| 21 | ∞ | 0.50 | 1.51633 | 64.1 | 20.00 |
| 22 | ∞ | (variable) | | | 20.00 |

Aspheric data

1st surface

K = −4.39302e+005  A4 = 2.66495e−004  A6 = −3.66801e−006
A8 = 2.93756e−008  A10 = −1.12868e−010

2nd surface

K = −1.73497e+000  A4 = 1.07426e−003  A6 = −1.07394e−006
A8 = 1.26888e−007  A10 = 8.27304e−011

8th surface

K = −3.07128e−001  A4 = −2.29854e−004  A6 = 6.52175e−006
A8 = −1.64145e−006  A10 = 8.32941e−008

16th surface

K = 0.00000e+000  A4 = 5.73806e−005  A6 = 3.23139e−005
A8 = −2.35249e−006  A10 = 6.20072e−008

Miscellaneous data
Zoom ratio 4.75

| | Wide-angle | Intermediate | Telephoto |
|---|---|---|---|
| Focal length | 4.43 | 12.65 | 21.05 |
| F number | 2.88 | 4.26 | 5.88 |
| Angle of view | 37.50 | 15.04 | 9.17 |
| Image height | 3.40 | 3.40 | 3.40 |
| Entire length of lens | 40.82 | 34.72 | 39.64 |
| BF | 0.30 | 0.27 | 0.18 |
| d4 | 18.49 | 4.26 | 1.12 |
| d15 | 2.40 | 11.85 | 19.20 |
| d17 | 3.63 | 2.33 | 3.13 |
| d22 | 0.30 | 3.80 | 8.44 |
| r6 | 37.56 | 351.26 | −187.78 |
| r19 | −32.10 | −160.48 | 32.10 |
| Entrance pupil position | 8.44 | 7.27 | 6.88 |
| Exit pupil position | −9.42 | −22.95 | −31.72 |
| Front principal point position | 10.85 | 13.03 | 14.04 |
| Rear principal point position | −4.13 | −12.38 | −20.87 |

Zoom lens unit data

| Unit | Initial surface | Focal length | Lens unit length | Front principal point position | Rear principal point position |
|---|---|---|---|---|---|
| 1 | 1 | −10.50 | 4.85 | 0.53 | −2.75 |
| 2 | 5 | 10.64 | 7.45 | −0.95 | −5.62 |
| 3 | 16 | 37.41 | 1.20 | −0.27 | −0.98 |
| 4 | 18 | 100.00 | 2.50 | 0.38 | −1.61 |

Single lens data

| Lens | Initial surface | Focal length |
|---|---|---|
| 1 | 1 | −7.21 |
| 2 | 3 | 23.51 |
| 3 | 5 | −58.14 |

-continued

Unit mm

| | | |
|---|---|---|
| 4 | 6 | 112.76 |
| 5 | 8 | 7.54 |
| 6 | 10 | 9.96 |
| 7 | 11 | −4.42 |
| 8 | 13 | 19.21 |
| 9 | 16 | 37.41 |
| 10 | 18 | 49.08 |
| 11 | 19 | −96.37 |
| 12 | 21 | 0.00 |

NUMERIC EXAMPLE 3

Unit mm

Surface data

| Surface number i | ri | di | ndi | vdi | effective diameter |
|---|---|---|---|---|---|
| 1 | 29.397 | 1.20 | 1.84666 | 23.8 | 25.77 |
| 2 | 17.032 | 5.55 | 1.77250 | 49.6 | 22.60 |
| 3 | 1892.933 | (variable) | | | 21.62 |
| 4 | 156.862 | 0.80 | 1.88300 | 40.8 | 17.32 |
| 5 | 9.488 | 4.42 | | | 13.25 |
| 6* | −17.514 | 1.00 | 1.88300 | 40.8 | 13.04 |
| 7* | 37.762 | 0.10 | | | 13.25 |
| 8 | 63.542 | 2.03 | 1.94595 | 18.0 | 13.25 |
| 9 | −30.670 | (variable) | | | 13.36 |
| 10 | ∞ | 8.00 | 1.80610 | 33.3 | 10.00 |
| 11 | ∞ | 0.10 | | | 9.02 |
| 12 | ∞ | (variable) | 1.33304 | 55.7 | 9.02 |
| 13 | (variable) | (variable) | 1.73770 | 40.0 | 8.92 |
| 14 | ∞ | (variable) | | | 8.87 |
| 15* | 11.394 | 4.99 | 1.49700 | 81.5 | 7.94 |
| 16 | −26.014 | 2.50 | | | 8.35 |
| 17 | 9.232 | 2.72 | 1.49700 | 81.5 | 7.25 |
| 18 | 20.516 | 0.60 | 2.00330 | 28.3 | 6.31 |
| 19 | 7.095 | 0.33 | | | 5.94 |
| 20 | 13.895 | 1.56 | 1.69895 | 30.1 | 5.94 |
| 21 | 23.416 | (variable) | | | 5.84 |
| 22 | ∞ | (variable) | 1.33304 | 55.7 | 8.15 |
| 23 | (variable) | (variable) | 1.73770 | 40.0 | 8.20 |
| 24 | ∞ | 0.10 | | | 8.28 |
| 25* | 15.007 | 2.04 | 1.43875 | 95.0 | 8.42 |
| 26 | 3459.951 | (variable) | | | 8.35 |
| 27 | ∞ | (variable) | 1.33304 | 55.7 | 10.00 |
| 28 | (variable) | (variable) | 1.73770 | 40.0 | 10.00 |
| 29 | ∞ | | | | 10.00 |

Aspheric data

6th surface

K = 0.00000e+000  A4 = −4.22458e−004  A6 = 2.03537e−005
A8 = −4.48262e−007  A10 = 3.76964e−009

7th surface

K = −9.37295e+001  A4 = −1.86139e−004  A6 = 1.34122e−005
A8 = −3.14173e−007  A10 = 2.71380e−009

15th surface

K = 7.74031e−001  A4 = −1.79994e−004  A6 = −1.21748e−006
A8 = −7.68902e−009

25th surface

K = 8.98920e−001  A4 = −4.72110e−005  A6 = 7.06658e−006
A8 = −5.65233e−007  A10 = 1.33876e−008

-continued

Unit mm

Miscellaneous data
Zoom ratio 9.45

| | Wide-angle | Intermediate | Telephoto |
|---|---|---|---|
| Focal length | 5.20 | 14.42 | 49.14 |
| F number | 2.93 | 3.93 | 6.22 |
| Angle of view | 33.9 | 13.6 | 4.1 |
| Image height | 3.50 | 3.50 | 3.50 |
| Entire length of lens | 88.50 | 88.50 | 88.50 |
| BF | 4.12 | 4.12 | 4.12 |
| d3 | 0.55 | 8.16 | 14.34 |
| d9 | 14.34 | 6.73 | 0.55 |
| d14 | 20.96 | 12.82 | 0.65 |
| d21 | 3.09 | 14.02 | 26.69 |
| d26 | 3.79 | 1.00 | 0.50 |
| d29 | 4.15 | 5.86 | 26.09 |
| r13 | 368.81 | 76.23 | 30.33 |
| d12 | 0.60 | 0.53 | 0.40 |
| d13 | 0.60 | 0.67 | 0.80 |
| r23 | 380.89 | −75.00 | −60.00 |
| d22 | 0.60 | 0.70 | 0.72 |
| d23 | 0.60 | 0.50 | 0.48 |
| r28 | 39181.87 | −6802.20 | −60.00 |
| d27 | 0.60 | 0.60 | 0.74 |
| d28 | 0.60 | 0.60 | 0.46 |
| Entrance pupil position | 18.07 | 37.68 | 58.44 |
| Exit pupil position | −21.04 | −46.48 | −74.15 |
| Front principal point position | 22.19 | 47.98 | 76.79 |
| Rear principal point position | −1.05 | −10.38 | −44.87 |

Zoom lens unit data

| Unit | Initial surface | Focal length | Lens unit length | Front principal point position | Rear principal point position |
|---|---|---|---|---|---|
| 1 | 1 | 41.39 | 6.75 | −0.18 | −3.95 |
| 2 | 4 | −8.48 | 8.35 | 0.98 | −5.62 |
| PR | 10 | ∞ | 8.00 | 0.00 | 0.00 |
| 3 | 12 | 911.40 | 1.20 | 0.45 | −0.35 |
| 4 | 15 | 18.97 | 12.71 | −6.15 | −11.01 |
| 5 | 22 | 33.15 | 3.34 | 0.87 | −1.44 |
| 6 | 27 | 96826.88 | 1.20 | 0.45 | −0.35 |

Single lens data

| Lens | Initial surface | Focal length |
|---|---|---|
| 1 | 1 | −50.05 |
| 2 | 2 | 22.22 |
| 3 | 4 | −11.47 |
| 4 | 6 | −13.44 |
| 5 | 8 | 22.10 |
| 6 | 10 | 0.00 |
| 7 | 12 | −1107.39 |
| 8 | 13 | 499.94 |
| 9 | 15 | 16.68 |
| 10 | 17 | 31.27 |
| 11 | 18 | −11.06 |
| 12 | 20 | 45.80 |
| 13 | 22 | −1143.68 |
| 14 | 23 | 516.32 |
| 15 | 25 | 34.35 |
| 16 | 27 | −117648.78 |
| 17 | 28 | 53113.55 |

NUMERIC EXAMPLE 4

Unit mm

Surface data

| Surface number i | ri | di | ndi | vdi | Effective diameter |
|---|---|---|---|---|---|
| 1* | 87.448 | 3.50 | 1.58593 | 59.6 | 43.54 |
| 2 | 13.318 | (variable) | | | 26.01 |
| 3 | −145.556 | 1.30 | 1.77250 | 49.6 | 24.47 |
| 4 | 24.148 | 0.06 | 1.51640 | 52.2 | 22.07 |
| 5* | 21.710 | 1.18 | | | 22.05 |
| 6 | 27.601 | 3.88 | 1.72825 | 28.5 | 21.85 |
| 7 | 97.186 | (variable) | | | 20.76 |
| 8 | −54.322 | 1.25 | 1.83481 | 42.7 | 11.65 |
| 9 | 15.722 | 4.13 | 1.51742 | 52.4 | 11.48 |
| 10 | −36.387 | 1.06 | | | 12.06 |
| 11(aperture) | ∞ | 1.50 | | | 12.26 |
| 12 | 57.720 | 2.48 | 1.51823 | 58.9 | 13.42 |
| 13 | −32.609 | (variable) | | | 13.74 |
| 14 | −28.135 | 0.80 | 1.80400 | 46.6 | 14.44 |
| 15 | −73.400 | 0.17 | | | 14.90 |
| 16 | ∞ | 1.90 | 1.33304 | 55.7 | 15.15 |
| 17 | (variable) | 1.10 | 1.73769 | 40.0 | 15.69 |
| 18 | ∞ | 0.30 | | | 16.12 |
| 19 | 47.868 | 3.42 | 1.84666 | 23.8 | 16.99 |
| 20 | −36.983 | (variable) | | | 17.38 |
| 21 | 59.392 | 5.76 | 1.48749 | 70.2 | 17.67 |
| 22 | −18.267 | 1.00 | 1.83400 | 37.2 | 17.59 |
| 23 | 38.697 | 0.05 | | | 18.46 |
| 24 | 18.482 | 6.35 | 1.43875 | 95.0 | 20.18 |
| 25 | −29.769 | 0.15 | | | 20.32 |
| 26 | 157.796 | 1.00 | 1.83400 | 37.2 | 19.89 |
| 27 | 16.754 | 7.24 | 1.48456 | 70.0 | 19.28 |
| 28* | −26.534 | (variable) | | | 19.64 |
| 29 | ∞ | 4.50 | 1.33304 | 55.7 | 19.91 |
| 30 | (variable) | 3.80 | 1.48000 | 54.6 | 20.25 |
| 31 | ∞ | 32.19 | | | 20.25 |
| 32 | ∞ | 2.90 | 1.54400 | 67.6 | 50.00 |
| 33 | ∞ | | | | 50.00 |

Aspheric data

1st surface

K = 0.00000e+000  A4 = 2.81271e−005  A6 = −6.64739e−008
A8 = 1.81153e−010  A10 = −2.68350e−013  A12 = 1.90592e−016

5th surface

K = 0.00000e+000  A4 = 2.48045e−006  A6 = −4.21349e−007
A8 = 3.98551e−009  A10 = −2.93680e−011  A12 = 9.05546e−014

28th surface

K = 0.00000e+000  A4 = 2.93617e−005  A6 = −7.97543e−008
A8 = 4.56680e−009  A10 = −4.19447e−011  A12 = 2.35569e−013

Miscellaneous data
Zoom ratio 2.07

| | Wide-angle | Intermediate | Telephoto |
|---|---|---|---|
| focal length | 10.32 | 12.65 | 21.36 |
| F number | 3.03 | 3.42 | 4.63 |
| Angle of view | 52.82 | 49.44 | 42.11 |
| Image height | 13.60 | 13.60 | 13.60 |
| Entire length of lens | 133.30 | 133.30 | 133.30 |
| BF | 1.24 | 1.24 | 1.24 |
| d2 | 13.54 | 13.54 | 13.54 |
| d7 | 17.28 | 13.42 | 4.74 |
| d13 | 1.27 | 1.11 | 4.41 |
| d20 | 6.90 | 5.62 | 1.26 |
| d28 | 0.10 | 5.37 | 15.15 |
| d33 | 1.19 | 0.69 | 2.17 |
| r17 | −33.75 | −40.53 | −100.91 |
| r30 | 19.52 | 35.92 | −14.06 |

-continued

Unit mm

| | | | |
|---|---|---|---|
| Entrance pupil position | 16.95 | 16.53 | 15.25 |
| Exit pupil position | −151.07 | −121.58 | −80.18 |
| Front principal point position | 26.57 | 27.88 | 31.01 |
| Rear principal point position | −9.12 | −11.46 | −20.16 |

Zoom lens unit data

| Unit | Initial surface | Focal length | Lens unit length | Front principal point position | Rear principal point position |
|---|---|---|---|---|---|
| 1 | 1 | −14.99 | 23.46 | 6.70 | −11.25 |
| 2 | 8 | 110.30 | 10.43 | 22.72 | 19.29 |
| 3 | 14 | 72.11 | 7.69 | 10.27 | 6.42 |
| 4 | 21 | 96.08 | 21.54 | 18.60 | 4.34 |
| 5 | 29 | 132.82 | 43.39 | 3.38 | −36.64 |

Single lens data

| Lens | Initial surface | Focal length |
|---|---|---|
| 1 | 1 | −27.29 |
| 2 | 3 | −26.72 |
| 3 | 4 | −419.79 |
| 4 | 6 | 51.72 |
| 5 | 8 | −14.49 |
| 6 | 9 | 21.81 |
| 7 | 12 | 40.59 |
| 8 | 14 | −57.19 |
| 9 | 16 | 101.33 |
| 10 | 17 | −45.75 |
| 11 | 19 | 25.11 |
| 12 | 21 | 29.37 |
| 13 | 22 | −14.76 |
| 14 | 24 | 27.08 |
| 15 | 26 | −22.55 |
| 16 | 27 | 22.42 |
| 17 | 29 | −58.61 |
| 18 | 30 | 40.66 |
| 19 | 32 | 0.00 |

NUMERIC EXAMPLE 5

Unit mm

Surface data

| Surface number i | ri | di | ndi | vdi | Effective diameter |
|---|---|---|---|---|---|
| 1 | 97.111 | 5.37 | 1.48749 | 70.2 | 67.00 |
| 2 | 280.836 | 0.15 | | | 66.57 |
| 3 | 100.431 | 3.50 | 1.74950 | 35.3 | 65.42 |
| 4 | 64.341 | 0.12 | | | 62.78 |
| 5 | 63.642 | 9.86 | 1.43385 | 95.2 | 62.80 |
| 6 | 1153.345 | (variable) | | | 62.22 |
| 7 | ∞ | 2.00 | | | 33.81 |
| 8 | −133.620 | 1.40 | 1.71300 | 53.9 | 33.05 |
| 9 | 69.024 | 3.72 | | | 31.73 |
| 10 | −68.267 | 1.40 | 1.62299 | 58.2 | 31.72 |
| 11 | 80.483 | 2.97 | 1.84666 | 23.8 | 32.32 |
| 12 | −466.606 | (variable) | | | 32.45 |
| 13 | 134.160 | 7.42 | 1.43875 | 95.0 | 36.19 |
| 14 | −42.336 | 0.17 | | | 36.14 |
| 15 | −44.108 | 2.00 | 1.70154 | 41.2 | 35.91 |
| 16 | −80.267 | 0.20 | | | 36.30 |
| 17 | 161.706 | 3.71 | 1.61772 | 49.8 | 35.87 |
| 18 | −172.210 | 3.00 | | | 35.66 |
| 19(aperture) | ∞ | (variable) | | | 34.25 |
| 20 | −52.851 | 2.90 | 1.54814 | 45.8 | 33.75 |
| 21 | −106.868 | 0.10 | | | 34.10 |
| 22 | ∞ | (variable) | 1.33304 | 55.7 | 34.03 |
| 23 | (variable) | (variable) | 1.55808 | 38.3 | 34.14 |
| 24 | ∞ | (variable) | | | 34.13 |
| 25 | 131.656 | 4.15 | 1.48749 | 70.2 | 34.05 |
| 26 | −85.460 | 0.15 | | | 33.93 |
| 27 | 107.407 | 1.60 | 1.80518 | 25.4 | 32.87 |
| 28 | 40.519 | 1.88 | | | 31.71 |
| 29 | 92.913 | 3.18 | 1.51633 | 64.1 | 31.71 |
| 30 | −176.938 | 0.10 | | | 31.65 |
| 31 | 32.792 | 4.06 | 1.66672 | 48.3 | 31.00 |
| 32 | 40.531 | (variable) | | | 29.53 |
| 33 | 181.993 | 1.40 | 1.83481 | 42.7 | 28.34 |
| 34 | 55.463 | 3.71 | 1.72825 | 28.5 | 27.64 |
| 35 | −103.463 | 1.40 | 1.77250 | 49.6 | 27.38 |
| 36 | 66.700 | 1.81 | | | 26.50 |
| 37 | ∞ | (variable) | 1.33304 | 55.7 | 26.46 |
| 38 | (variable) | (variable) | 1.48000 | 54.6 | 26.61 |
| 39 | ∞ | (variable) | | | 26.91 |

Miscellaneous data
Zoom ratio 3.80

| | Wide-angle | Intermediate | Telephoto |
|---|---|---|---|
| Focal length | 103.00 | 164.90 | 391.00 |
| F number | 4.31 | 5.18 | 5.87 |
| Angle of view | 11.86 | 7.47 | 3.17 |
| Image height | 21.64 | 21.64 | 21.64 |
| Entire length of lens | 255.18 | 276.19 | 320.00 |
| BF | 74.00 | 97.15 | 132.44 |
| d6 | 12.58 | 33.59 | 77.40 |
| d12 | 45.15 | 32.09 | 6.44 |
| d19 | 12.06 | 9.87 | 4.77 |
| d24 | 11.15 | 4.59 | 10.45 |
| d32 | 16.21 | 14.87 | 4.46 |
| d39 | 74.07 | 90.89 | 110.15 |
| r23 | 186.51 | 143.97 | 142.55 |
| d22 | 2.00 | 1.87 | 1.86 |
| d23 | 3.15 | 3.29 | 3.29 |
| r38 | −751.49 | −77.21 | −58.98 |
| d37 | 3.45 | 4.06 | 4.28 |
| d38 | 2.00 | 1.39 | 1.18 |
| Entrance pupil position | 84.03 | 131.45 | 299.49 |
| Exit pupil position | −47.95 | −38.64 | −34.39 |
| Front principal point position | 100.09 | 96.11 | −225.80 |
| Rear principal point position | −28.93 | −67.74 | −258.54 |

Zoom lens unit data

| Unit | Initial surface | Focal length | Lens unit length | Front principal point position | Rear principal point position |
|---|---|---|---|---|---|
| 1 | 1 | 176.83 | 19.00 | −1.73 | −14.35 |
| 2 | 7 | −49.11 | 11.50 | 3.08 | −5.93 |
| 3 | 13 | 73.29 | 16.50 | 6.12 | −6.03 |
| 4 | 20 | −256.24 | 8.15 | −3.53 | −9.11 |
| 5 | 25 | 95.43 | 15.11 | 1.46 | −8.61 |
| 6 | 33 | −106.31 | 13.77 | 5.03 | −4.48 |

Single lens data

| Lens | Initial surface | Focal length |
|---|---|---|
| 1 | 1 | 301.61 |
| 2 | 3 | −249.25 |
| 3 | 5 | 154.84 |
| 4 | 8 | −63.65 |
| 5 | 10 | −59.08 |
| 6 | 11 | 81.28 |
| 7 | 13 | 74.30 |
| 8 | 15 | −142.83 |
| 9 | 17 | 135.58 |
| 10 | 20 | −194.46 |
| 11 | 22 | −560.01 |
| 12 | 23 | 334.19 |
| 13 | 25 | 106.97 |
| 14 | 27 | −81.68 |
| 15 | 29 | 118.47 |
| 16 | 31 | 212.91 |

-continued

| Unit mm | | |
|---|---|---|
| 17 | 33 | −96.04 |
| 18 | 34 | 50.07 |
| 19 | 35 | −52.31 |
| 20 | 37 | 2256.45 |
| 21 | 38 | −1565.61 |

Table 1 shows values of the conditional expressions in the numeric examples.

TABLE 1

| | Conditional Expression (1) | Conditional Expression (2) | Conditional Expression (3) | Conditional Expression (6) | Conditional Expression (7) |
|---|---|---|---|---|---|
| Numeric Example 1 | 0.0046 | 0.203 | 0.165 | −0.88 | 0.34 |
| Numeric Example 2 | −0.0122 | 0.097 | 0.193 | −1.09 | 0.47 |
| Numeric Example 3 | −0.0035 | 0.196 | 0.108 | −0.80 | 0.47 |
| Numeric Example 4 | −0.0021 | 0.118 | 0.267 | −0.71 | 0.97 |
| Numeric Example 5 | −0.0116 | 0.075 | 0.460 | 2.47 | 0.51 |

Table 2 shows the changes in the refractive powers $\Delta\phi 1j$ and $\Delta\phi 2j$ of the media of the variable refractive power elements in the numeric examples.

TABLE 2

| | $\Delta\phi 11$ | $\Delta\phi 12$ | $\Delta\phi 21$ | $\Delta\phi 22$ | $\Delta\phi 23$ | $\Delta\phi 24$ |
|---|---|---|---|---|---|---|
| Numeric Example 1 | −0.0132 | 0.0259 | 0.0139 | −0.0243 | — | — |
| Numeric Example 2 | 0.0206 | −0.0106 | −0.0408 | 0.0208 | — | — |
| Numeric Example 3 | −0.0101 | 0.0223 | 0.0064 | −0.0142 | 0.0056 | −0.0123 |
| Numeric Example 4 | −0.0066 | 0.0145 | 0.0408 | −0.0587 | — | — |
| Numeric Example 5 | −0.0006 | 0.0009 | 0.0052 | −0.0075 | — | — |

Figure 12:
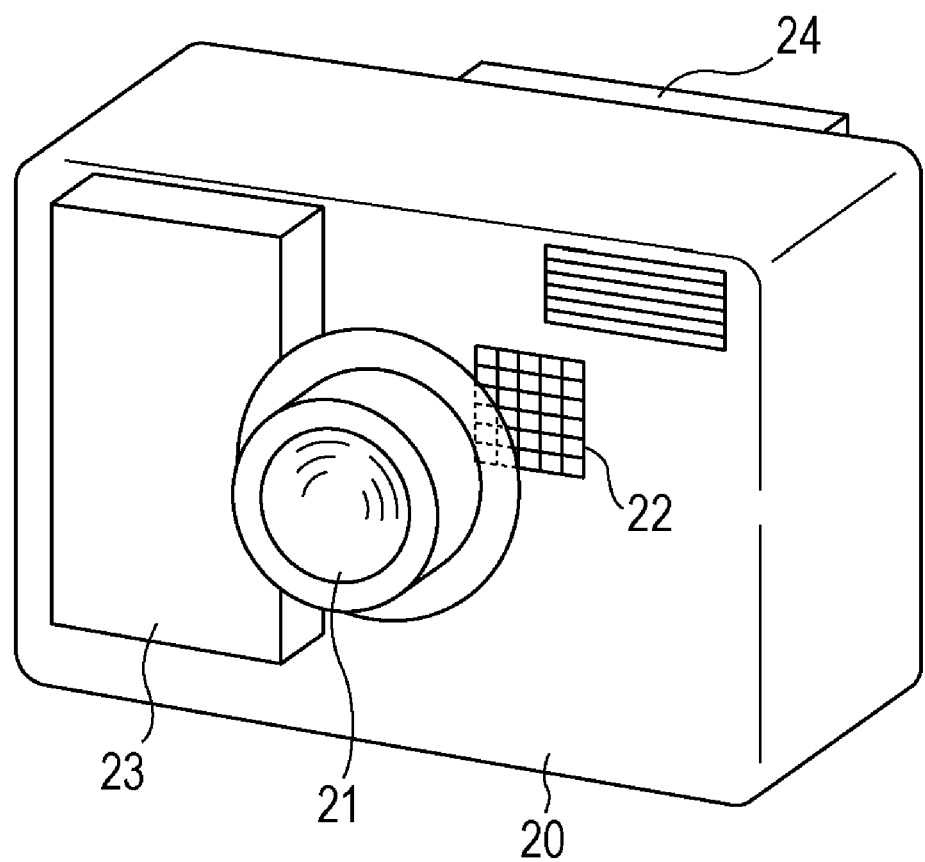
FIG. 12 is a schematic view of an image pickup apparatus according to the present invention.

Referring to FIG. 12, an embodiment of a digital still camera, which is an example of an image pickup apparatus or optical apparatus including the zoom lens according to at least one embodiment of the present invention, will be described. FIG. 12 illustrates a camera body 2, and an image taking optical system 21 including a zoom lens according to the present invention. A solid-state image pickup device (photoelectric conversion element) 22, which is a charge-coupled device (CCD) sensor or a complementary metal oxide semiconductor (CMOS) sensor for receiving an image of an object formed by the image taking optical system 21, is disposed in the camera body. A memory 23 stores data of an object image that has been photoelectrically converted by the image pickup device 22. A viewfinder 24, which includes an LCD panel or the like, is used to observe an object image formed on the solid-state image pickup device 22. By thus applying the zoom lens according to the present invention to an image pickup apparatus, such as a digital still camera, an image pickup apparatus having a small size and a high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims benefit of International Patent Application No. PCT/JP2010/059095, filed May 28, 2010, which is hereby incorporated by reference herein in its entirety.

The invention claimed is:

1. A zoom lens comprising:
a first variable refractive power element formed of different media and configured to change a refractive power thereof in a positive direction by changing a shape of an interface between the different media during zooming from a wide angle end to a telephoto end; and
a second variable refractive power element formed of different media and configured to change a refractive power thereof in a negative direction by changing a shape of an interface between the different media during zooming from a wide angle end to a telephoto end,
wherein an imaging magnification of at least one of the first and second variable refractive power elements increases during zooming from the wide angle end to the telephoto end, and
wherein the following conditional expression is satisfied $$-0.0150 < \{\Sigma(\Delta\phi 1j/\nu 1j) + \Sigma(\Delta\phi 2j/\nu 2j)\} \cdot ft < 0.0075,$$

where j is an integer equal to or greater than 1 indicative of the order of the medium of the variable refractive power element counted from the side of the variable refractive power element on which light is incident, and where $\Delta\phi 1j$ is the amount of change in the refractive power of each of the media of the first variable refractive power element during zooming from the wide angle end to the telephoto end, $\nu 1j$ is the Abbe number of each of the media of the first variable refractive power element, $\Delta\phi 2j$ is the amount of change in the refractive power of each of the media of the second variable refractive power element during zooming from the wide angle end to the telephoto end, $\nu 2j$ is the Abbe number of each of the media of the second variable refractive power element, and ft is the focal length of the zoom lens at the telephoto end.

2. The zoom lens according to claim 1, wherein the following conditional expressions are satisfied $$0.05 < |\Delta\phi 1min \cdot \sqrt{(fw \cdot ft)}| < 0.50$$

$$0.05 < |\Delta\phi 2min \cdot \sqrt{(fw \cdot ft)}| < 0.50,$$

where, during zooming from the wide angle end to the telephoto end, $\Delta\phi 1$ min is the amount of change in the refractive power of the first variable refractive power element for which the amount of change in the refractive power is the minimum in the case where the zoom lens includes a plurality of the first variable refractive power elements or the amount of change in the refractive power of the first variable refractive power element in the case where the zoom lens includes only one first variable refractive power element, and $\Delta\phi 2$ min is the amount of change in the refractive power of the second variable refractive power element for which the amount of change in the refractive power is the minimum in the case where the zoom lens includes a plurality of the second variable refractive power elements or the amount of change in the refractive power of the second variable refractive power element in the case where the zoom lens includes only one second variable refractive power element.

3. The zoom lens according to claim 1,
wherein at least one of the variable refractive power elements satisfies the following conditional expressions $$28 < \nu dmax < 55$$

$$1.55 < Ndmax,$$

where vdmax is the Abbe number and Ndmax is the refractive index of one of the media of the at least one of the variable refractive power elements, the one of the media having the highest refractive index.

4. The zoom lens according to claim 1,
wherein the following conditional expression is satisfied $$-2.0 < f1/\sqrt{(fw \cdot ft)} < -0.5,$$

where f1 is the focal length, at the wide angle end, of an optical system from a lens disposed closest to an object side to a lens disposed adjacent to the object side of the first variable refractive power element.

5. The zoom lens according to claim 1,
wherein the following conditional expression is satisfied $$0.1 < f2/\sqrt{(fw \cdot ft)} < 2.5,$$

where f2 is the focal length, at the wide angle end, of an optical system from a lens disposed closest to the object side to a lens disposed adjacent to the object side of the second variable refractive power element.

6. The zoom lens according to claim 1,
wherein at least one of the first variable refractive power element and the second variable refractive power element is included in at least a part of a lens unit that moves during zooming from the wide angle end to the telephoto end.

7. The zoom lens according to claim 1, further comprising:
a lens unit whose refractive power does not change during zooming from the wide angle end to the telephoto end,
wherein an imaging magnification of the lens unit increases during zooming from the wide angle end to the telephoto end.

8. An image pickup apparatus comprising:
a zoom lens; and
an image pickup device that captures an image formed by the zoom lens,
wherein the zoom lens comprises:
a first variable refractive power element formed of different media and configured to change a refractive power therof in a positive direction by changing a shape of an interface between the different media during zooming from a wide angle end to a telephoto end; and
a second variable refractive power element formed of different media and configured to change a refractive power thereof in a negative direction by changing a shape of an interface between the different media during zooming from a wide angle end to a telephoto end,
wherein an imaging magnification of at least one of the first and second variable refractive power elements increases during zooming from the wide angle end to the telephoto end, and
wherein the following conditional expression is satisfied $$-0.0150 < \{\Sigma(\Delta\phi 1j/\nu 1j) + \Sigma(\Delta\phi 2j/\nu j)\} \cdot ft < 0.0075,$$

where j is an integer equal to or greater than 1 indicative of the order of the medium of the variable refractive power element counted from the side of the variable refractive power element on which light is incident, and
where $\Delta\phi 1j$ is the amount of change in the refractive power of each of the media of the first variable refractive power element during zooming from the wide angle end to the telephoto end, $\nu 1j$ is the Abbe number of each of the media of the first variable refractive power element, $\Delta\phi 2j$ is the amount of change in the refractive power of each of the media of the second variable refractive power element during zooming from the wide angle end to the telephoto end, $\nu 2j$ is the Abbe number of each of the media of the second variable refractive power element, and ft is the focal length of the zoom lens at the telephoto end.

* * * * *